US012596364B2

(12) United States Patent
Yates et al.

(10) Patent No.: US 12,596,364 B2
(45) Date of Patent: Apr. 7, 2026

(54) DATA ANALYTICS FOR PREDICTIVE MAINTENANCE

(71) Applicant: PACIFIC GAS AND ELECTRIC COMPANY, San Francisco, CA (US)

(72) Inventors: Devon Yates, Boulder, CO (US);
John-Peter Dolphin, San Francisco, CA (US); Eric Schoenman, San Francisco, CA (US); Louis William McFaul, IV, Albany, CA (US); Maryam Variani, Walnut Creek, CA (US); Sabrin Mohamed, Alameda, CA (US); Aayushi Gupta, Sunnyvale, CA (US); Shane Buck, Sunnyvale, CA (US); Ana Maria Nungo, Pleasant Hill, CA (US)

(73) Assignee: PACIFIC GAS AND ELECTRIC COMPANY, San Francisco, CA (US)

( * ) Notice: Subject to any disclaimer, the term of this patent is extended or adjusted under 35 U.S.C. 154(b) by 416 days.

(21) Appl. No.: 18/133,670

(22) Filed: Apr. 12, 2023

(65) Prior Publication Data

US 2023/0324900 A1     Oct. 12, 2023

Related U.S. Application Data

(60) Provisional application No. 63/330,032, filed on Apr. 12, 2022.

(51) Int. Cl.
G05B 23/02          (2006.01)
(52) U.S. Cl.
CPC ..... G05B 23/0283 (2013.01); G05B 23/0216 (2013.01); G05B 23/024 (2013.01)

(58) Field of Classification Search
CPC ............ G05B 23/0283; G05B 23/0216; G05B 23/024
See application file for complete search history.

(56) References Cited

U.S. PATENT DOCUMENTS

| | | | |
|---|---|---|---|
| 11,892,830 B2 * | 2/2024 | Fenstermacher | ...... G06N 20/00 |
| 2014/0222355 A1 * | 8/2014 | Cheim | ................. G05B 23/024 |
| | | | 702/58 |
| 2021/0203157 A1 * | 7/2021 | Visweswariah | ......... H02J 3/001 |
| 2023/0063023 A1 * | 3/2023 | Wang | ..................... G06N 20/00 |

FOREIGN PATENT DOCUMENTS

| | | | | |
|---|---|---|---|---|
| CN | 111413562 A | * | 7/2020 | ............. G01R 31/00 |

OTHER PUBLICATIONS

Translation of CN111413562 description section (Year: 2020).*

* cited by examiner

*Primary Examiner* — Manuel L Barbee
(74) *Attorney, Agent, or Firm* — Greenberg Traurig, LLP

(57) ABSTRACT

In some embodiments, systems and methods described herein are directed to using smart meters to determine an operational status of an asset. In some embodiments, the asset is a transformer. In some embodiments, the system receives data from the smart meters such as voltage and associates the data with an asset feeding electricity to the smart meter. In some embodiments, the system includes a data analytics platform that can generate a failure probability prediction using the smart meter data. In some embodiments, the system includes an AI model configured to receive smart meter data, execute a decision analysis, and return a designation of whether the asset is at risk of failure or has failed.

12 Claims, 45 Drawing Sheets

What is the California EPIC Program?

The Electric Program Investment Charge (EPIC) is a California Statewide Program that Enables PG&E to Invest in & Pursue New/Novel Emerging Energy Solutions to Meet California's Energy Goals & Drive Innovation in the Industry

EPIC Promotes Building the Energy Network of Tomorrow Through Innovation Focused on

Increased Safety • Improved Affordability • Greater Reliability

Renewables and Distributed Energy Resources (DER) Integration

Grid Modernization and Optimization

Customer Focused Products and Services Enablement

Foundational Strategies & Technologies

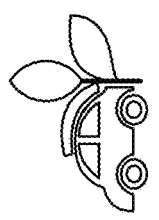

FIG. 7

Electric Distribution System Overview

— Electric Distribution Lines
☐ Electric Service Territory

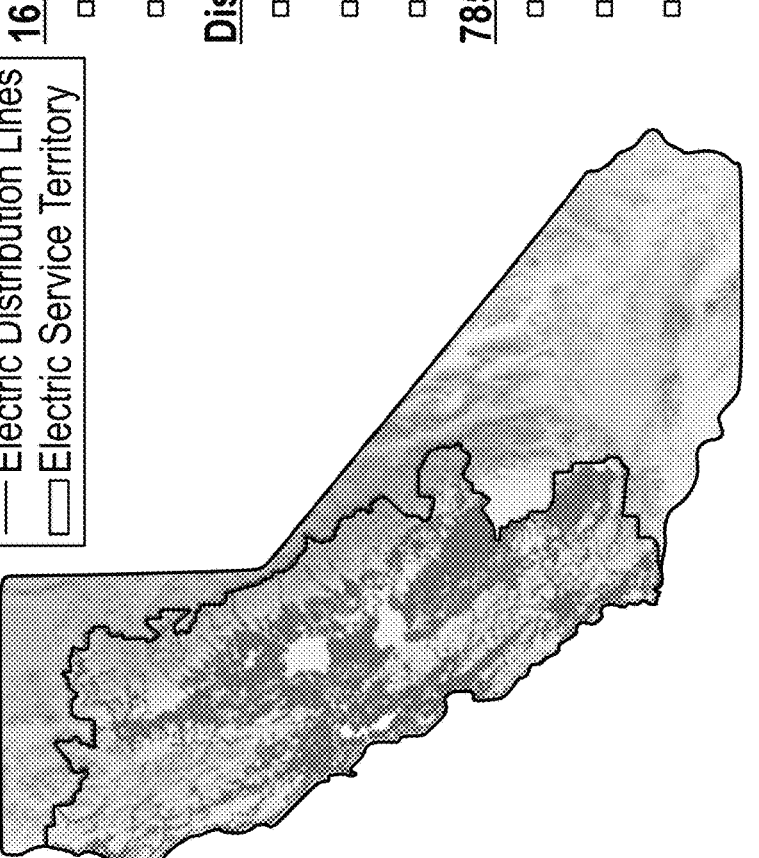

16 Million Customers (5.5 Million Accounts)

☐ 99.9% SmartMeter Penetration

☐ 102,000 miles of Distribution Lines

Distributed Energy Resources & Clean Transportation

☐ 4,871 MW of BTM Solar PV Capacity (450K sites)

☐ 108 MW of BTM Storage Capacity (7K sites)

☐ 263,000 Electric Vehicles (+~16,000 EVs/month)

785 Distribution Substations

☐ 3,000 Distribution Circuits

☐ 1,000,000 Service Transformers

☐ 2,500 Voltage Regulators, 12,000 Capacitor Banks

FIG. 8

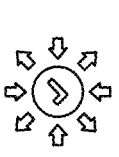
Features
Equipment Characteristics
Historical and Forecast Temperature
Transormer Interval Load
Model
Automatic Failure Classification
Continued Model Refinement
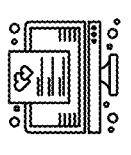
Product
Field Inspections - Feedback Loop
Path to Production
FIG. 9

Would you ignore your car's check engine light?

What is Predictive Maintenance?

Broadly, Predictive Maintenance means replacing the right assets at the right time. Predictive Maintenance is one component of an optimized asset investment strategy.

Asset Analytics Timeframes Depend on Available Data Types (e.g., Real-Time Monitoring vs. Static Data)

| | | |
|---|---|---|
| Long Term | Population Survival Analysis<br>- Age-Based Failure Distribution<br>- Grouping by Asset Types | Ex: Calculate Likelihood of Pole Failure Based on Age, Material, etc. |
| Medium Term | Individual Asset Loss of Life<br>- Historical Stress Factors<br>- Load, Temperature, Outages, Voltage Events, Location | Ex: Calculate UG Cable Operational Age, Failure Risk vs. Actual Age |
| Short Term | Anomaly Detection<br>- Failure Pattern Recognition<br>- Topology Hierarchy Identification | Ex: Predict Impending Tx Failure via AMI Voltage Data |

FIG. 14

Key Takeaway: Asset Health & Risk can be Predicted on Different Timescales Depending on Asset Type and Granularity of Available Data. Combining Data Across Categories can Result in more Robust Predictive Models.

Impact of Data Resolution on Observability of Real-Time Distribution System Anomalies: Phenomena

FIG. 15

System Focus on Electrical Service Transformers (Not Substation Transformers)

Population:

Overhead: 782,000
Subsurface: 101,000
Pad-Mount: 127,000
~1,000,000

Asset Strategy:

• Visual inspection every 3-5 years
• Otherwise, *run to problem*

Annual Failure Statistics:

• >12,000 total service transformers are removed/replaced annually, including from external causes (~1.2% of population)
• ~3,900 transformers per year are replaced due to age/internal failure, (.4% of population)

FIG. 17

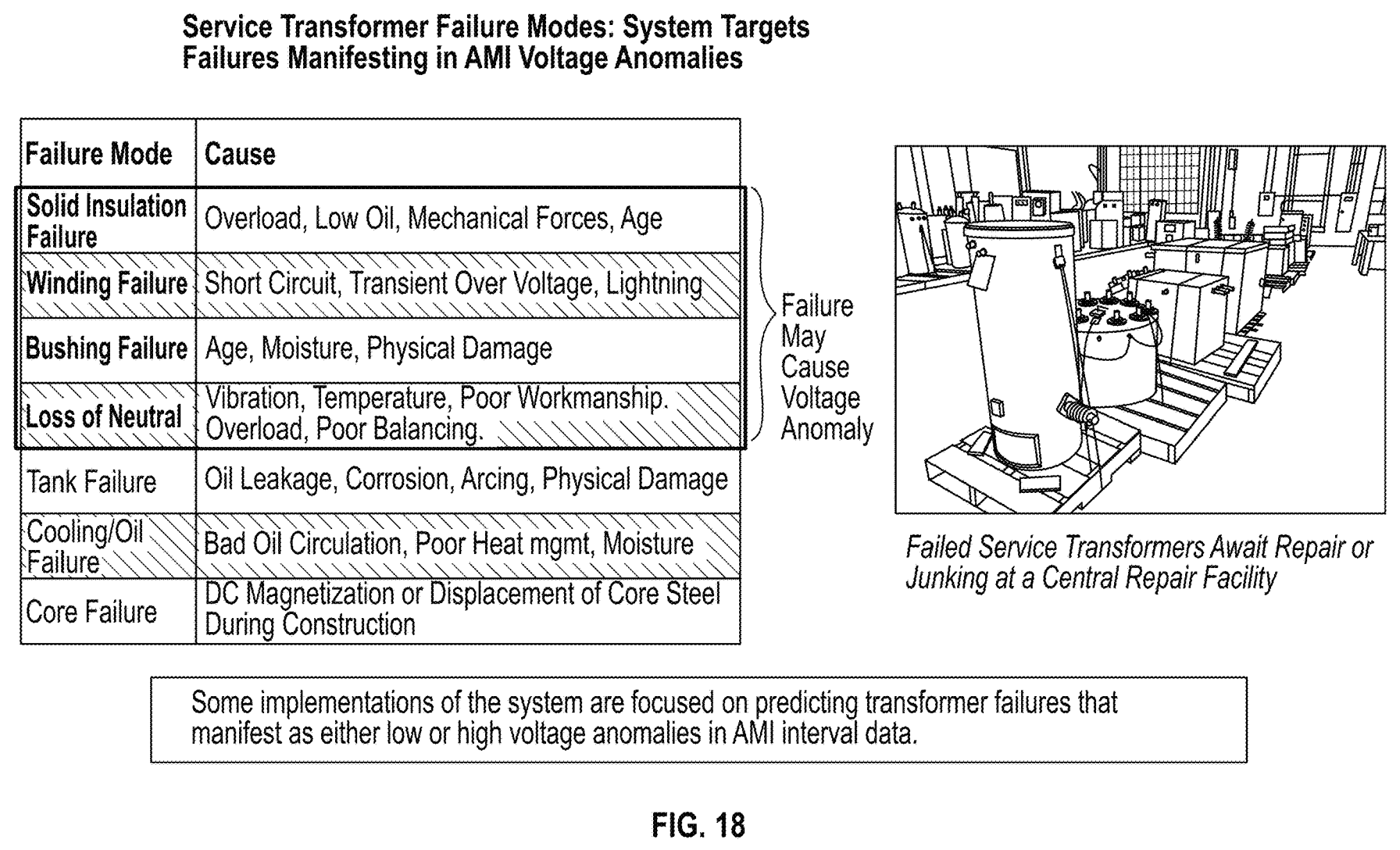

Service Transformer Failure Modes: System Targets Failures Manifesting in AMI Voltage Anomalies

| Failure Mode | Cause |
|---|---|
| Solid Insulation Failure | Overload, Low Oil, Mechanical Forces, Age |
| Winding Failure | Short Circuit, Transient Over Voltage, Lightning |
| Bushing Failure | Age, Moisture, Physical Damage |
| Loss of Neutral | Vibration, Temperature, Poor Workmanship. Overload, Poor Balancing. |
| Tank Failure | Oil Leakage, Corrosion, Arcing, Physical Damage |
| Cooling/Oil Failure | Bad Oil Circulation, Poor Heat mgmt, Moisture |
| Core Failure | DC Magnetization or Displacement of Core Steel During Construction |

Failure May Cause Voltage Anomaly

Failed Service Transformers Await Repair or Junking at a Central Repair Facility Some implementations of the system are focused on predicting transformer failures that manifest as either low or high voltage anomalies in AMI interval data.

FIG. 18

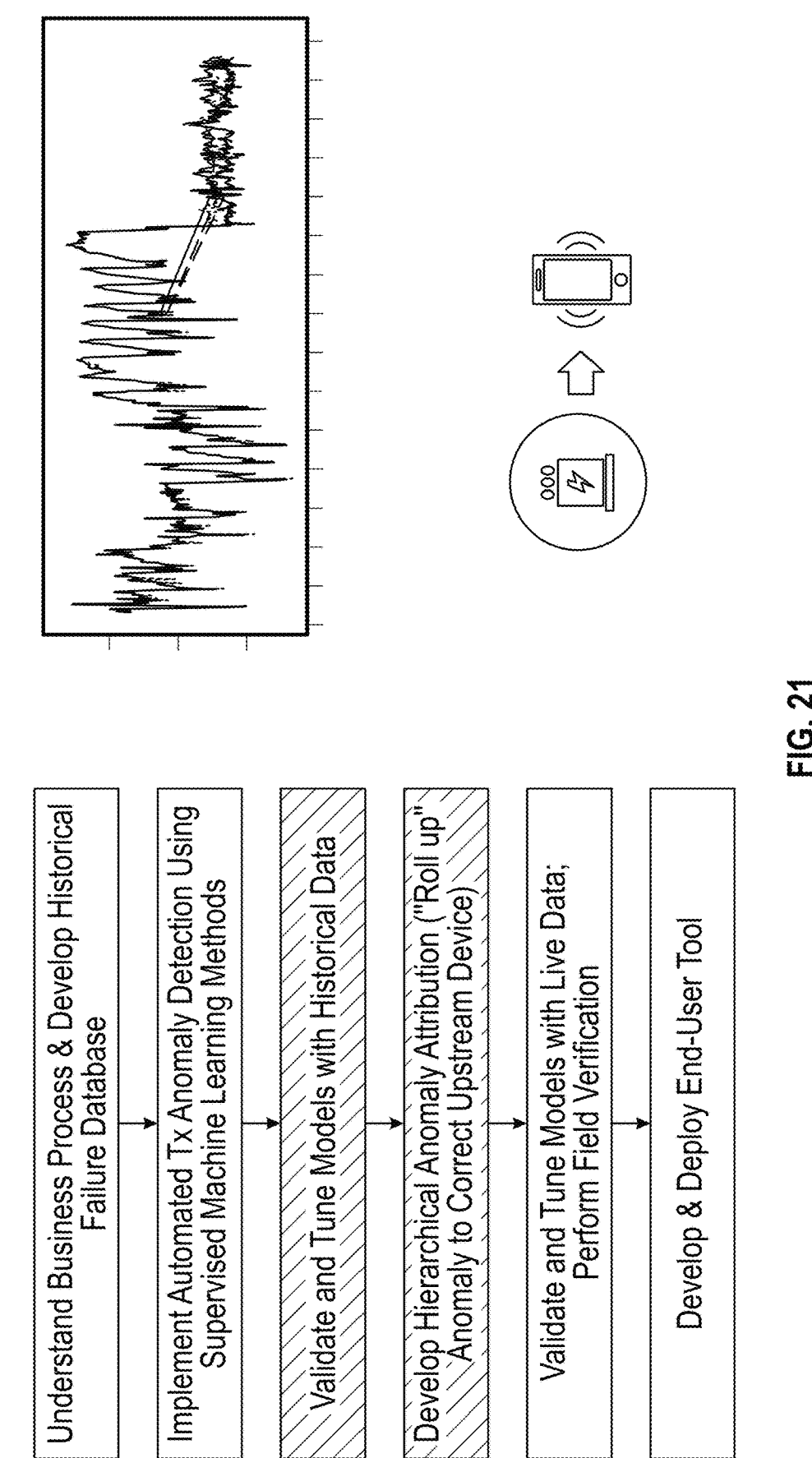

System Predictive Analytics Development and Implementation Process Steps for Transformers

Understand Business Process & Develop Historical Failure Database

Implement Automated Tx Anomaly Detection Using Supervised Machine Learning Methods Validate and Tune Models with Historical Data Develop Hierarchical Anomaly Attribution ("Roll up" Anomaly to Correct Upstream Device)

Validate and Tune Models with Live Data; Perform Field Verification

Develop & Deploy End-User Tool

FIG. 21

The System Reduces Wildfire Risk, Unplanned Outage Costs and Customer Claims

Future State:
- Predictive Maintenance Tool Indicates Issue
  - Assess, Repair/Replace

Scenario 1:
- Tx is Run to Failure or Damaged
  - Repair/Replace on Emergency

Scenario 2:
- Tx fails 5-year inspection
  - Repair/Replace on Emergency or Planned Work

Scenario 3:
- Voltage Anomaly Indicates Issue
  - Troubleshoot using Voltage Complaint Process Status Quo

| Potential Benefit | Scale of Annual Impact |
|---|---|
| Reduced Wildfire Risk | Up to $30B for Catastrophic Events; Public & Employee Safety Benefits |
| Reduced Customer Outage Claims | Avg. Annual Outage-Related Customer Claims: $6M/year |
| Reduced Emergency Restoration Costs | 2017 Emergency Restoration Costs for 3.20 Target Assets: >$29M in 2017 |
| Reduced CAIDI/SAIDI | TBD |
| Increased Customer & Employee Satisfaction | TBD |

FIG. 26

System Data Quality Challenges and Mitigations

| Problem Statement | Mitigation |
|---|---|
| 1. Electric Asset Health Analytics are Limited by a Lack of Trusted & Available Data on Past Asset Failures and Inaccuracies in GIS & Other Systems | Strengthen Data Quality Governance Programs and Establish an Asset Failure Program |
| 2. Field Processes that Record Information on Asset Failure (Problem Codes & Equipment ID Association) Lack Accountability and Consistency | Align Work Management, Restoration, and Inspection Processes to Improve Data Integrity |
| 3. Asset Condition and Failure Data is Spread Across Multiple Sources/Systems and is Not in One Comprehensive Database | Combine Failure Data from Disparate Sources into a Trusted Dataset "Asset Data Foundation"); Provide Standard Data Prep Tools so Trained users can Self-Serve |

FIG. 27

System Asset Data Foundation Concept

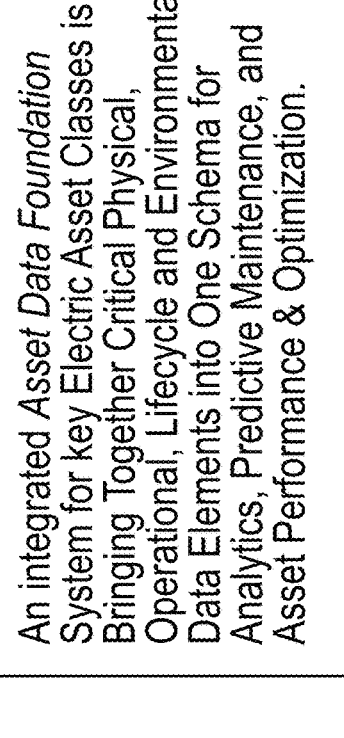

An integrated *Asset Data Foundation* System for key Electric Asset Classes is Bringing Together Critical Physical, Operational, Lifecycle and Environmental Data Elements into One Schema for Analytics, Predictive Maintenance, and Asset Performance & Optimization.

Asset Failure Data

Asset Condition Data

Spatial & As-Built Data

Asset Data Foundation

Work Mgmt & Grid Planning

External Environment Data

Asset Operational Data

FIG. 28

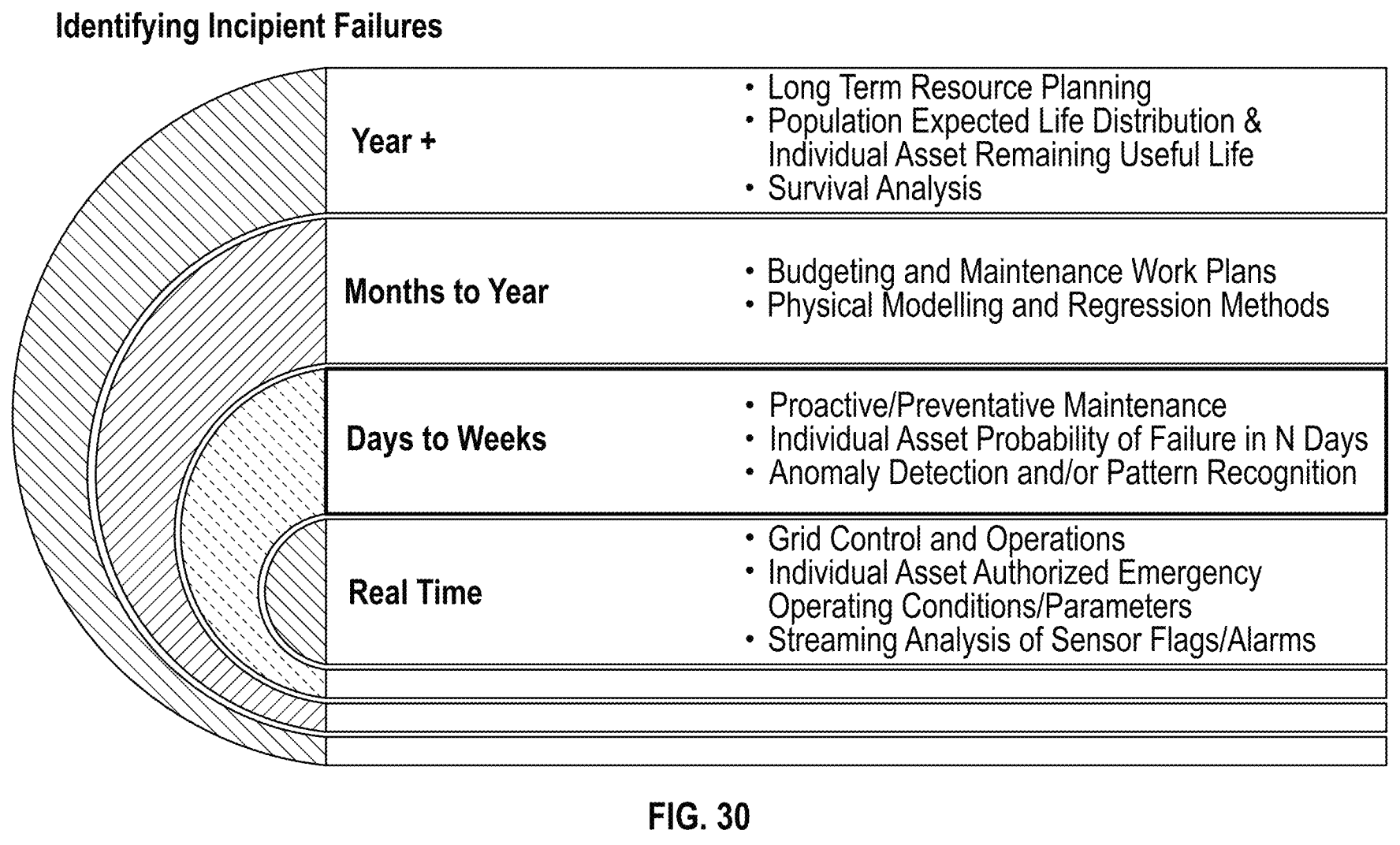

Identifying Incipient Failures

Year +
- Long Term Resource Planning
- Population Expected Life Distribution & Individual Asset Remaining Useful Life
- Survival Analysis

Months to Year
- Budgeting and Maintenance Work Plans
- Physical Modelling and Regression Methods

Days to Weeks
- Proactive/Preventative Maintenance
- Individual Asset Probability of Failure in N Days
- Anomaly Detection and/or Pattern Recognition

Real Time
- Grid Control and Operations
- Individual Asset Authorized Emergency Operating Conditions/Parameters
- Streaming Analysis of Sensor Flags/Alarms

FIG. 30

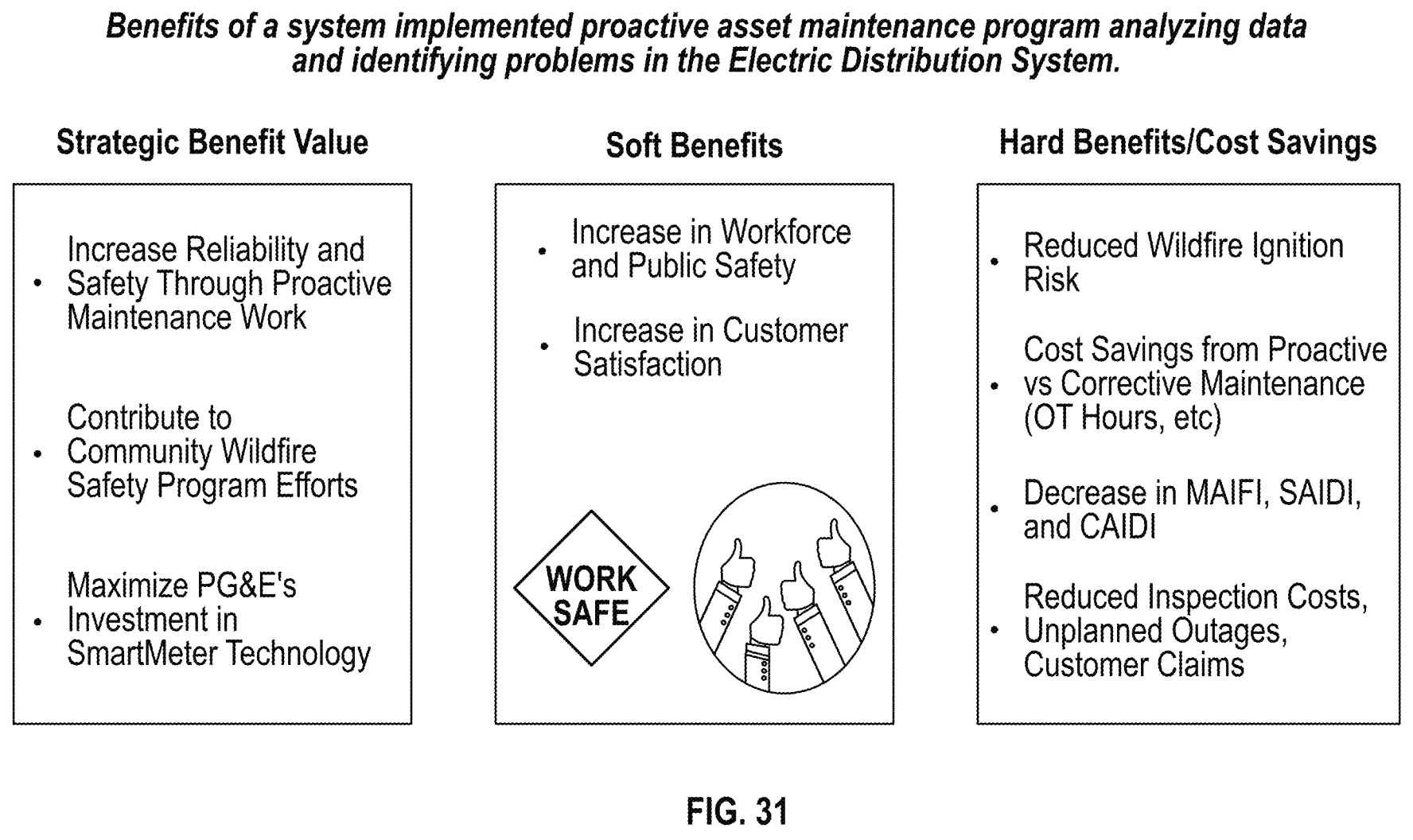

*Benefits of a system implemented proactive asset maintenance program analyzing data and identifying problems in the Electric Distribution System.*

Strategic Benefit Value

- Increase Reliability and Safety Through Proactive Maintenance Work

- Contribute to Community Wildfire Safety Program Efforts

- Maximize PG&E's Investment in SmartMeter Technology

Soft Benefits

- Increase in Workforce and Public Safety

- Increase in Customer Satisfaction

WORK SAFE

Hard Benefits/Cost Savings

- Reduced Wildfire Ignition Risk

- Cost Savings from Proactive vs Corrective Maintenance (OT Hours, etc)

- Decrease in MAIFI, SAIDI, and CAIDI

- Reduced Inspection Costs, Unplanned Outages, Customer Claims

FIG. 31

Diagram of Assets/Terms Used in the System

Service Point Meter

Primary Conductor

Secondary Conductor

Service Drop Conductor

Service Transformer

- Number of Service Transformers in Scope: ~600,00
- Service Point Interval Voltage Data (15 Mins or Hourly) is Used to Summarize Voltage Anomaly Under a Transformer

Initial Implementation Objective:

Features

Equipment Characteristics

Historical and Forecast Temperature

Transformer Interval Load

Model

Automatic Failure Classification

Continued Model Refinement

Product

Field Inspections - Feedback Loop

Path to Production

DATA ANALYTICS FOR PREDICTIVE MAINTENANCE

CROSS-REFERENCE TO RELATED APPLICATION

This application claims the benefit of priority from U.S. Provisional Application No. 63/330,032, filed Apr. 12, 2022, entitled "DATA ANALYTICS FOR PREDICTIVE MAINTENANCE," which is incorporated herein by reference in its entirety.

BACKGROUND

A utility's approach to asset management impacts reliability of service, system affordability, and a company's risk profile. The approach that has dominated the utility industry for decades is "emergency outage restoration"—essentially waiting for equipment failure and responding as quickly as possible once failure occurs. This approach aims to minimize near term costs that are passed on to customers through the utilization of an asset through its entire life. A helpful analogy for emergency outage restoration would be replacing a tire on your car only after it goes flat. While this maximizes the life of the tire, it can lead to an unscheduled inconvenience, and the act of the tire going flat can put the occupants of the vehicle at risk. Further, if a tow truck is required, those costs are typically far more expensive than simply replacing the tire before being at risk of a flat. Similarly, waiting for utility equipment failure can increase risk and expense.

Allowing electrical components to run to failure may present an environmental risk. A fire from a utility component such as an electrical transformer may spread to surrounding foliage. Electrical distribution systems have various components that could be a source of ignition upon failure. In a worst-case scenario, an ignition resulting from component failure could possibly lead to a wildfire. Identification of these at-risk assets before failure would be beneficial to reduce the chances of these undesirable events. However, predicting a utility component's imminent failure has not been possible in the past.

The utility industry has adopted "scheduled maintenance" and "condition-based maintenance" approaches, both of which further reduce risk when compared to emergency outage restoration. However, all conventional maintenance techniques either cost the utility company extra money by taking an asset out of service before the end of its useful life or by allowing components to fail which can interrupt electrical utility service and may create various risks.

Therefore, there is a need in the art for a system and method for using sensor data and advanced analytics to identify signs of imminent failure to extend service life without allowing equipment failure.

SUMMARY

In some embodiments, the disclosure is direct to systems and methods (generally referred to as the system) for predicting asset failure in an electrical distribution system. In some embodiments, the system comprises one or more of one or more assets, one or more electrical meters, and one or more data analytics platforms. In some embodiments, the system includes one or more computers comprising one or more processors and one or more non-transitory computer readable media, the one or more non-transitory computer readable media include program instructions stored thereon that when executed cause the one or more computers to execute one or more program steps. In some embodiments, a step includes to receive, by the one or more processors, meter data from the one or more electrical meters. In some embodiments, a step includes to associate, by the one or more processors, the meter data with the asset to create asset data. In some embodiments, a step includes to analyze, by the data analytics platform, the asset data. In some embodiments, a step includes to return, by the data analytics platform, a failure prediction model of the asset based on the asset data.

In some embodiments, the meter data comprises voltage. In some embodiments, the one or more non-transitory computer readable media include program instructions stored thereon that when executed cause the one or more computers to select, by the one or more processors, at least one of the one or more electrical meters with a highest voltage. In some embodiments, a step includes to assign, by the one or more processors, at least one of the one or more electrical meters with the highest voltage as at least part of the asset data. In some embodiments, a step includes to exclude, by the one or more processors, at least one of the one or more electrical meters with a voltage lower than the highest voltage from the asset data.

In some embodiments, the one or more non-transitory computer readable media include program instructions stored thereon that when executed cause the one or more computers to send, by the one or more processors, the failure prediction model to an artificial intelligence (AI) model. In some embodiments, the AI model is configured to determine if the asset will fail based on a comparison to previous failure prediction models. In some embodiments, a step includes to receive, by the AI model, a plurality of failure prediction models. In some embodiments, a step includes to generate, by the AI model, a failure designation for each of the plurality of failure prediction models.

In some embodiments, the system comprises one or more of a first asset, a first electrical meter, a second asset, a second electrical meter, an artificial intelligence (AI) model. In some embodiments, the one or more non-transitory computer readable media include program instructions stored thereon that when executed cause the one or more computers to receive, by the one or more processors, first meter data from the first electrical meter. In some embodiments, a step includes to associate, by the one or more processors, the first meter data with a first asset to create first asset data. In some embodiments, a step includes to receive, by the one or more processors, second meter data from a second electrical meter. In some embodiments, a step includes to associate, by the one or more processors, the second meter data with a second asset to create second asset data. In some embodiments, a step includes to send, by the one or more processors, the first asset data and the second asset data to the AI model.

In some embodiments, the one or more non-transitory computer readable media include program instructions stored thereon that when executed further cause the one or more computers to generate, by the one or more processors, a graphical user interface (GUI) comprising an input configured to enable a user to designate the first asset data as a match or a non-match for a condition. In some embodiments, a step includes to receive, by the one or more processors, a first asset designation comprising a designation by the user of the first asset as a first match or a first non-match for the condition. In some embodiments, sending the first asset data and the second asset data to the AI model includes sending the first asset designation. In some embodiments, the first asset data and the second asset data are used to train the AI model.

In some embodiments, the one or more non-transitory computer readable media include program instructions stored thereon that when executed further cause the one or more computers to output, by the AI model, a first asset designation comprising a first designation of the first asset as a first match or a first non-match for a condition. In some embodiments, a step includes to output, by the AI model, a second asset designation comprising a second designation of the second asset as a second match or a second non-match for the condition. In some embodiments, a step includes to generate, by the one or more processors, a graphical user interface comprising at least one of the first asset designation and the second asset designation. In some embodiments, a step includes to generate, by the one or more processors, an input for changing at least one of the first asset designation and the second asset designation. In some embodiments, a step includes to receive, by the one or more processors, a changed designation comprising a change of at least one of the first asset designation and the second asset designation. In some embodiments, a step includes to send, by the one or more processors, the changed designation to the AI model to improve a decision analysis of the AI model.

In some embodiments, the system includes a data analytics platform. In some embodiments, the one or more non-transitory computer readable media include program instructions stored thereon that when executed further cause the one or more computers to determine, by the data analytics platform, a life expectancy of the first asset based on the first asset data.

In some embodiments, the disclosure is directed to a method for creating an artificial intelligence model to predict asset failure in an electrical distribution system. In some embodiments, a step includes receiving first meter data from a first electrical meter. In some embodiments, a step includes associating the first meter data with a first asset to create first asset data. In some embodiments, a step includes receiving second meter data from a second electrical meter. In some embodiments, a step includes associating the second meter data with a second asset to create second asset data. In some embodiments, a step includes designating the first asset data as a first match or a first non-match for a condition. In some embodiments, a step includes sending the first asset data and the second asset data to an artificial intelligence (AI) model as a training set.

In some embodiments, a step includes outputting a result of a decision analysis by the AI model. In some embodiments, the results comprise a match designation or a non-match designation for the condition for the second asset. In some embodiments, a step includes generating a graphical user interface comprising the result. In some embodiments, a step includes generating an input for changing the result to create a changed result. In some embodiments, a step includes sending the changed result to the AI model to improve the decision analysis.

In some embodiments, a step includes creating a plurality of asset data by associating meter data from one or more meters to each of a plurality of assets. In some embodiments, a step includes sending the plurality of asset data to the AI model for a decision analysis. In some embodiments, a step includes outputting results of the decision analysis, the results comprising a match designation or a non-match designation for the condition for each of the plurality of assets.

In some embodiments, a step includes generating a graphical user interface comprising at least one of the results. In some embodiments, a step includes generating an input for changing at least one of the results to create a changed result. In some embodiments, a step includes sending the changed result to the AI model to improve the decision analysis. In some embodiments, the decision analysis includes a transformer failure prediction. In some embodiments, the plurality of assets includes at least one transformer. In some embodiments, the first asset and/or second asset comprises a transformer.

DRAWINGS DESCRIPTION

FIGS. 7-28 illustrate a non-limiting system implementation overview including various system configurations and implemented steps according to some embodiments.

FIG. 7 includes an overview of the California Epic program according to some embodiments.

FIG. 8 shows an electrical distribution system suitable for implementation of the system according to some embodiments.

FIG. 9 shows steps for system implementation and refinement by a utility according to some embodiments.

Figure 10:
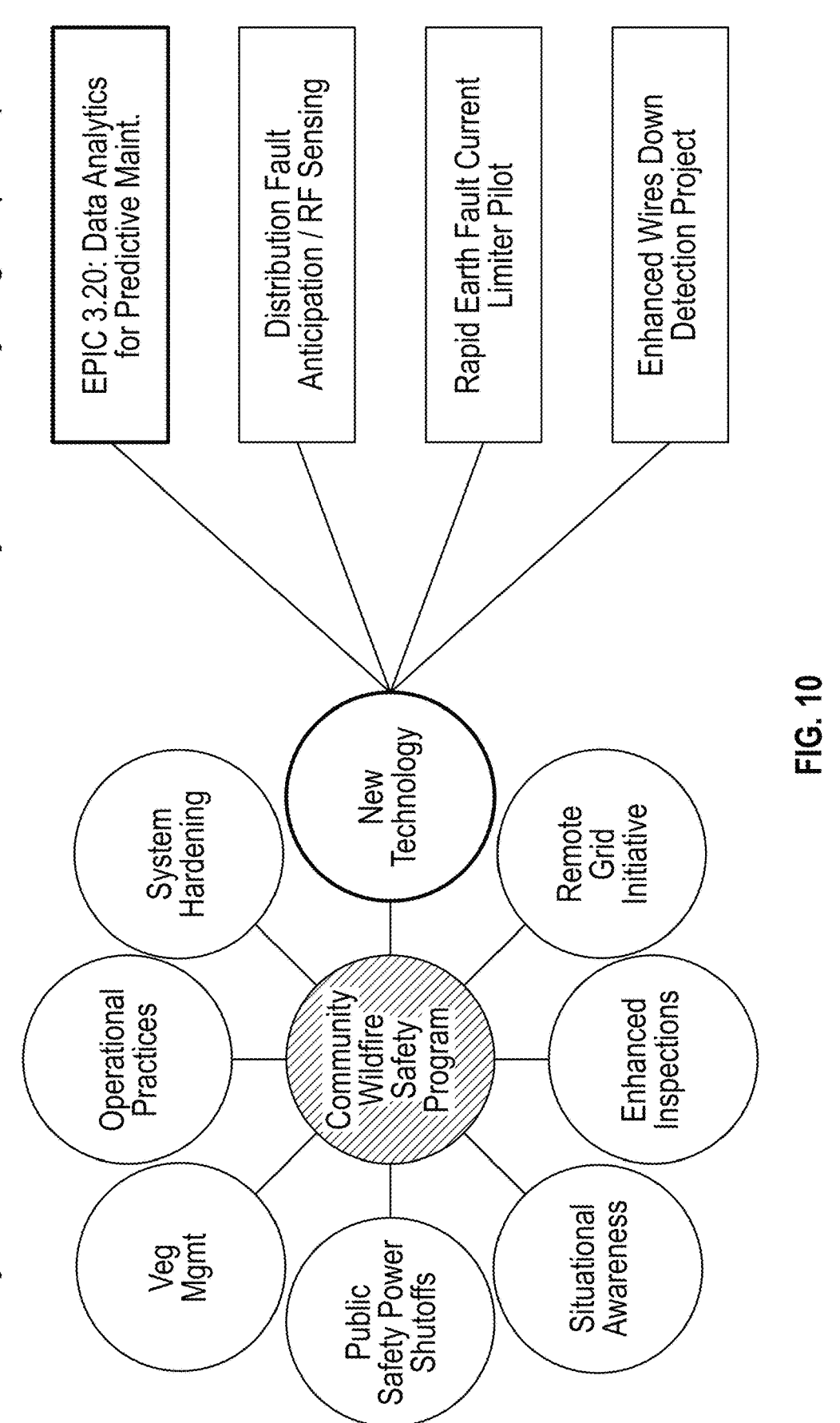

FIG. 10 shows the system implemented as part of a Community Wildfire Safety Program (CWSP) according to some embodiments.

Figure 11:
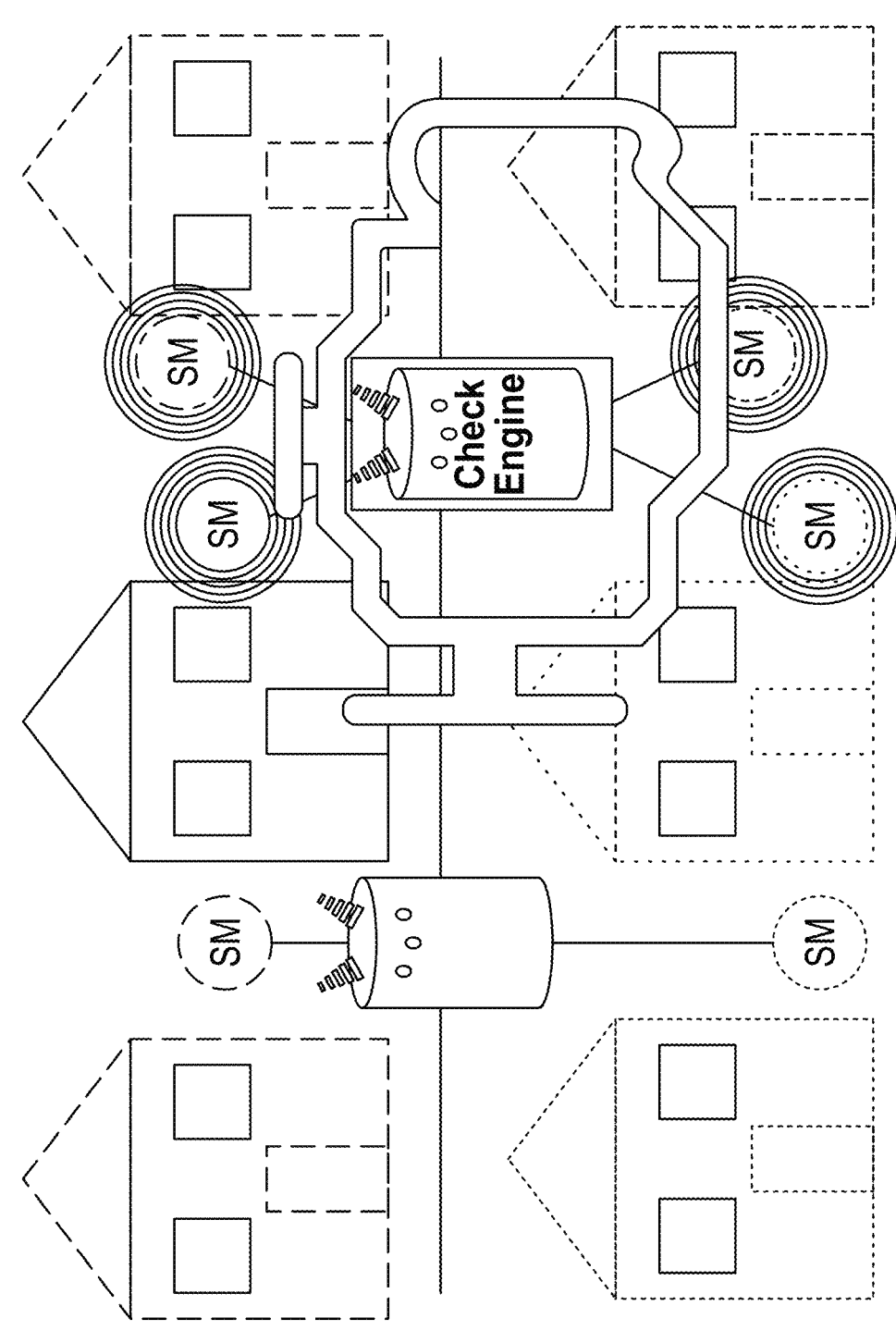

FIG. 11 illustrates the analogy of using aspects of the system as a "check engine light" according to some embodiments.

Figure 12:
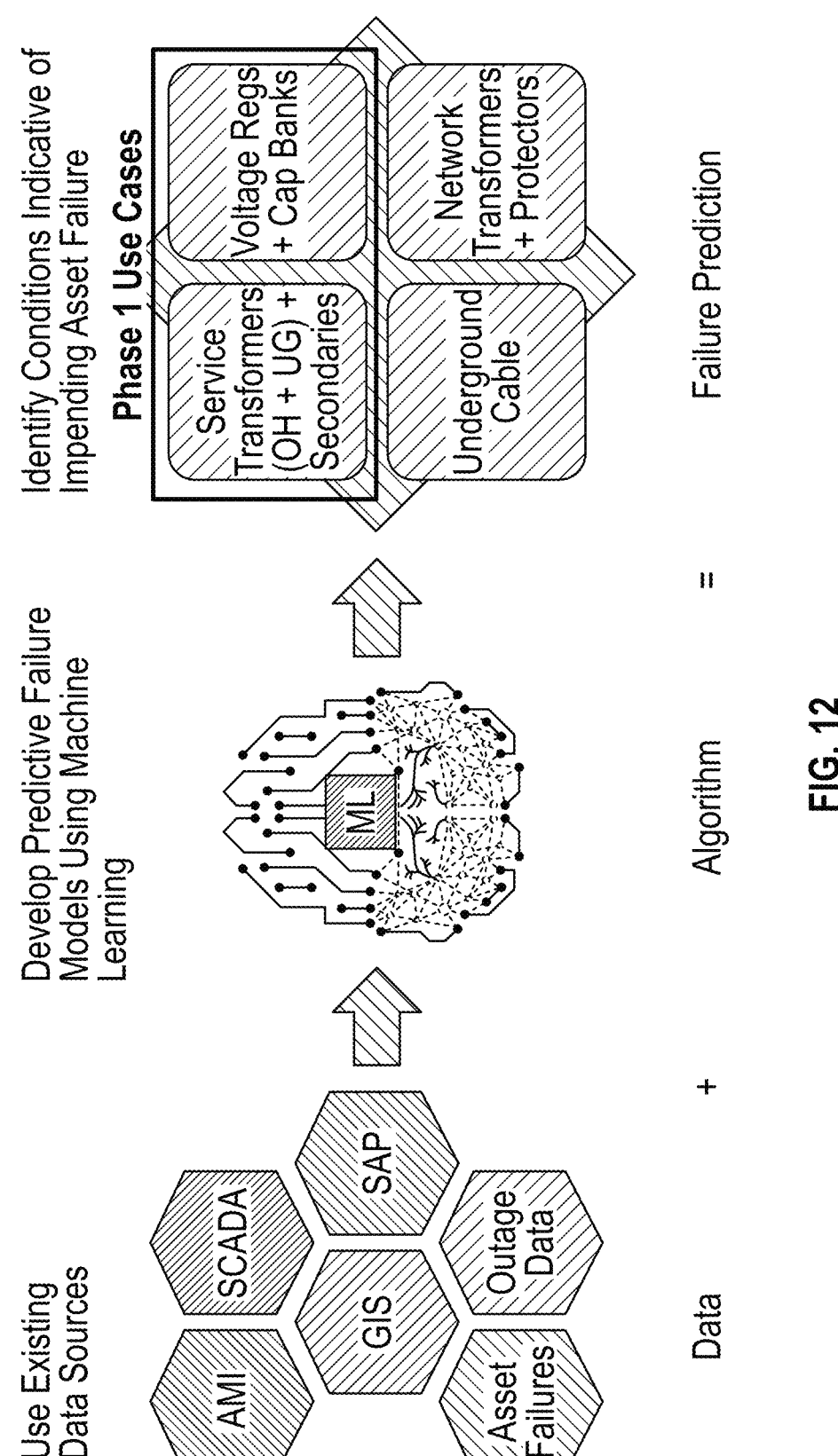

FIG. 12 shows the system's data-drive asset strategy enablement according to some embodiments.

Figure 13:
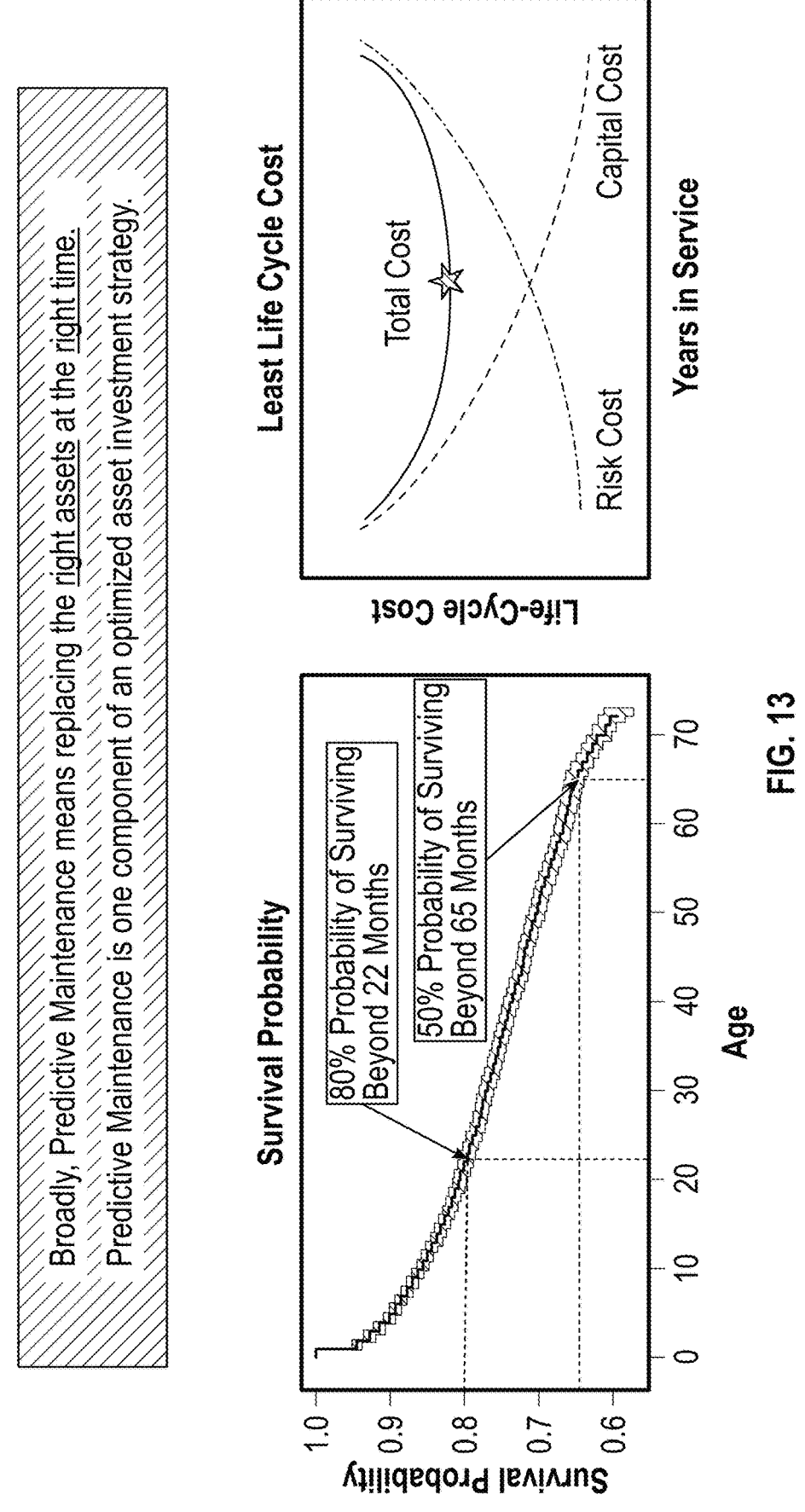

FIG. 13 illustrates a predictive maintenance strategy according to some embodiments.

FIG. 14 shows asset (component) analytics timeframes dependent on available data types according to some embodiments.

Figure 15:
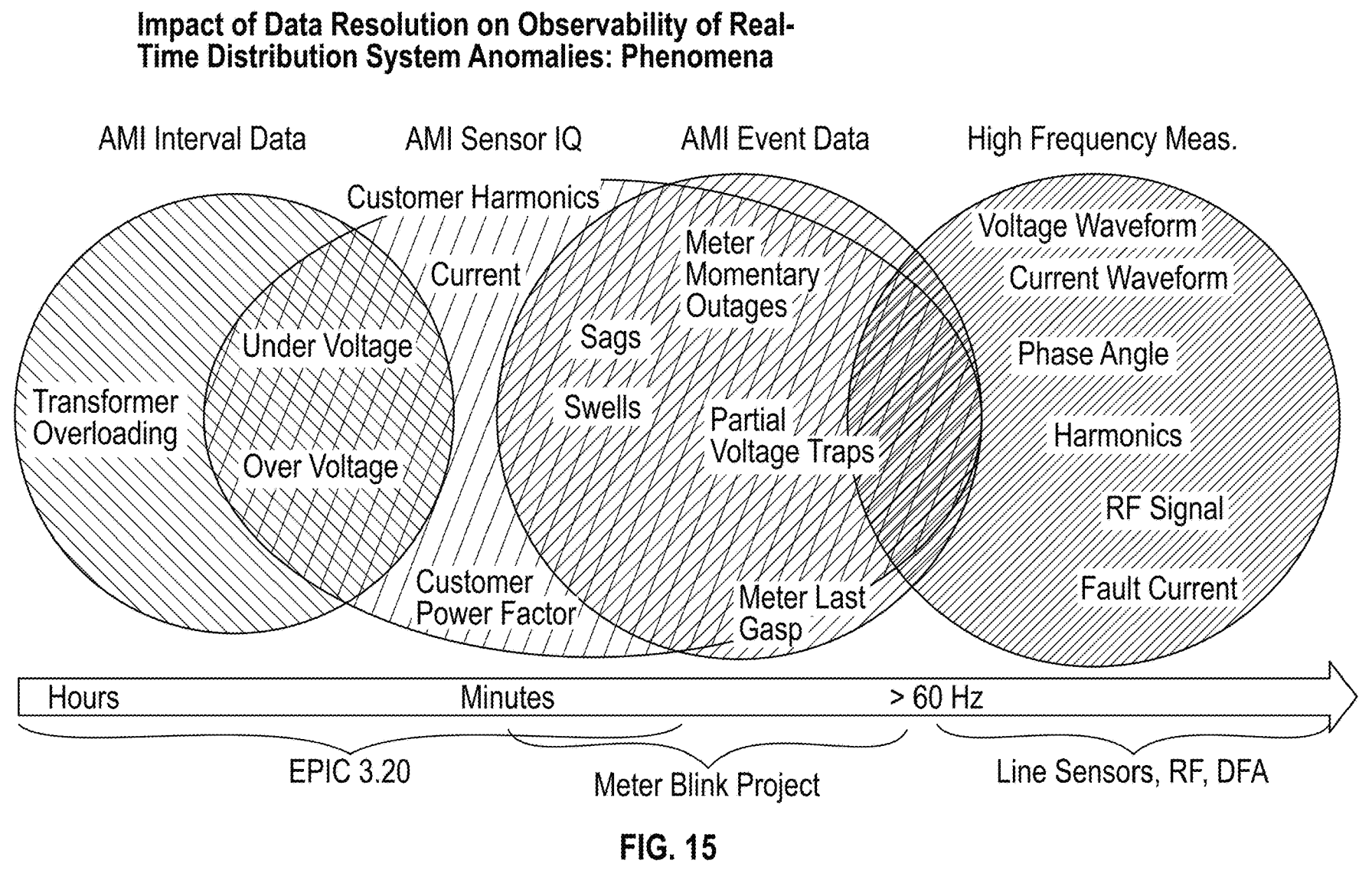

FIG. 15 shows the phenomena of data resolution impact on observability of near real-time distribution system anomalies according to some embodiments.

Figure 16:
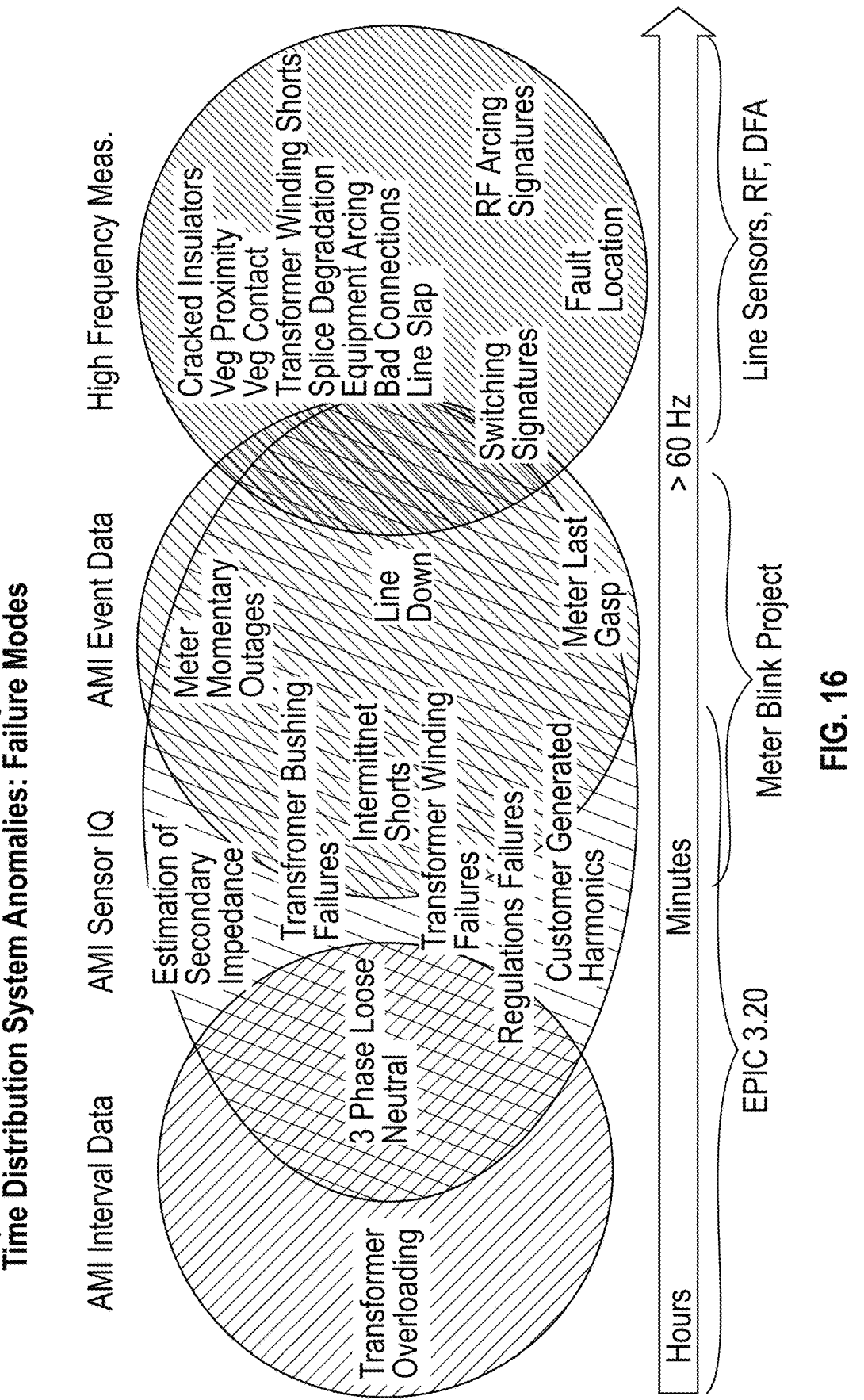

FIG. 16 shows the failure modes of data resolution's impact on observability of near real-time distribution system anomalies according to some embodiments.

FIG. 17 shows the system's focus on electrical service transformers and not substation transformers according to some embodiments.

FIG. 18 illustrates how the system targets failures manifesting in AMI voltage anomalies according to some embodiments.

Figure 19:
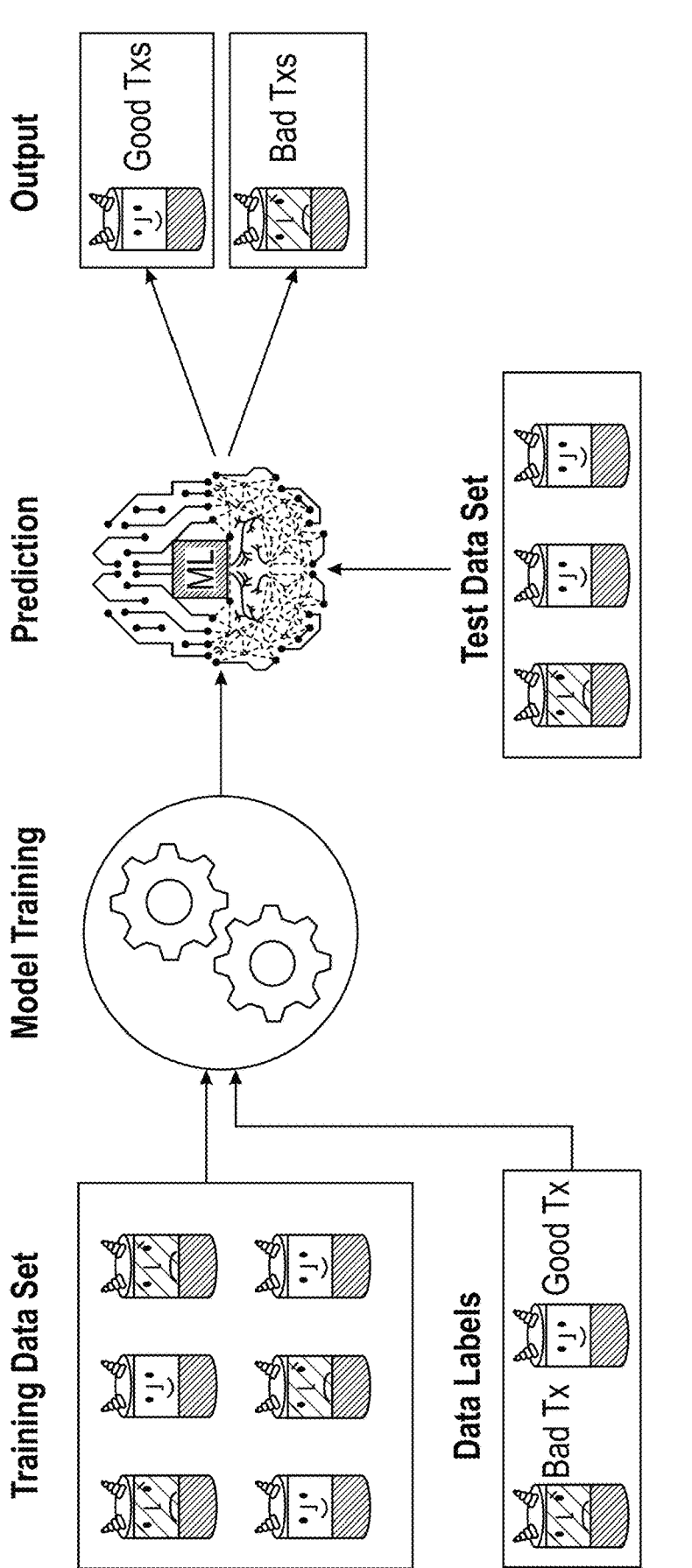

FIG. 19 illustrates steps for implementing a supervised system machine learning process according to some embodiments.

Figure 20:
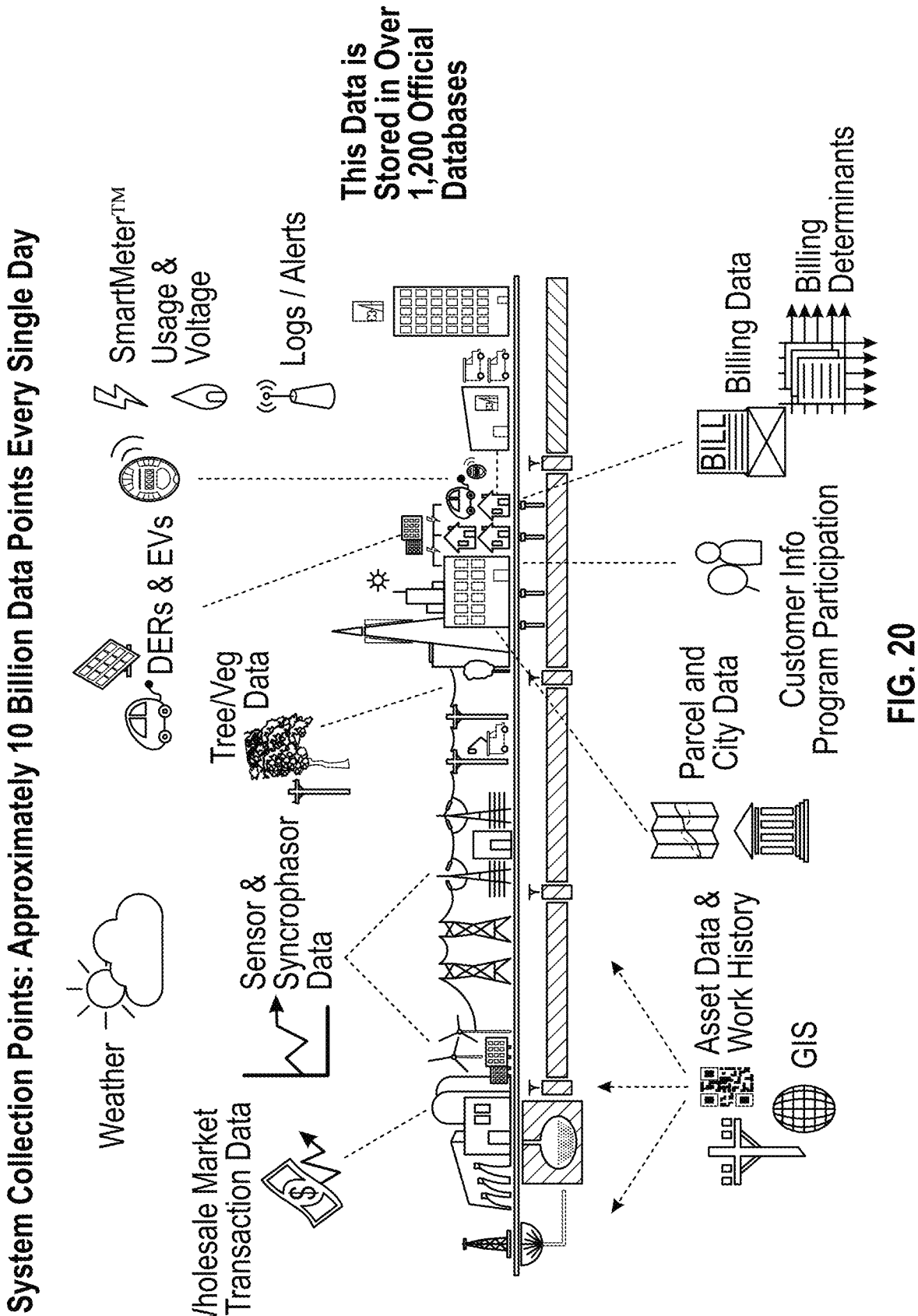

FIG. 20 shows various subsystems that the system uses to collect data inputs according to some embodiments.

FIG. 21 shows system predictive analytics development and implementation process steps for transformers according to some embodiments.

Figure 22:
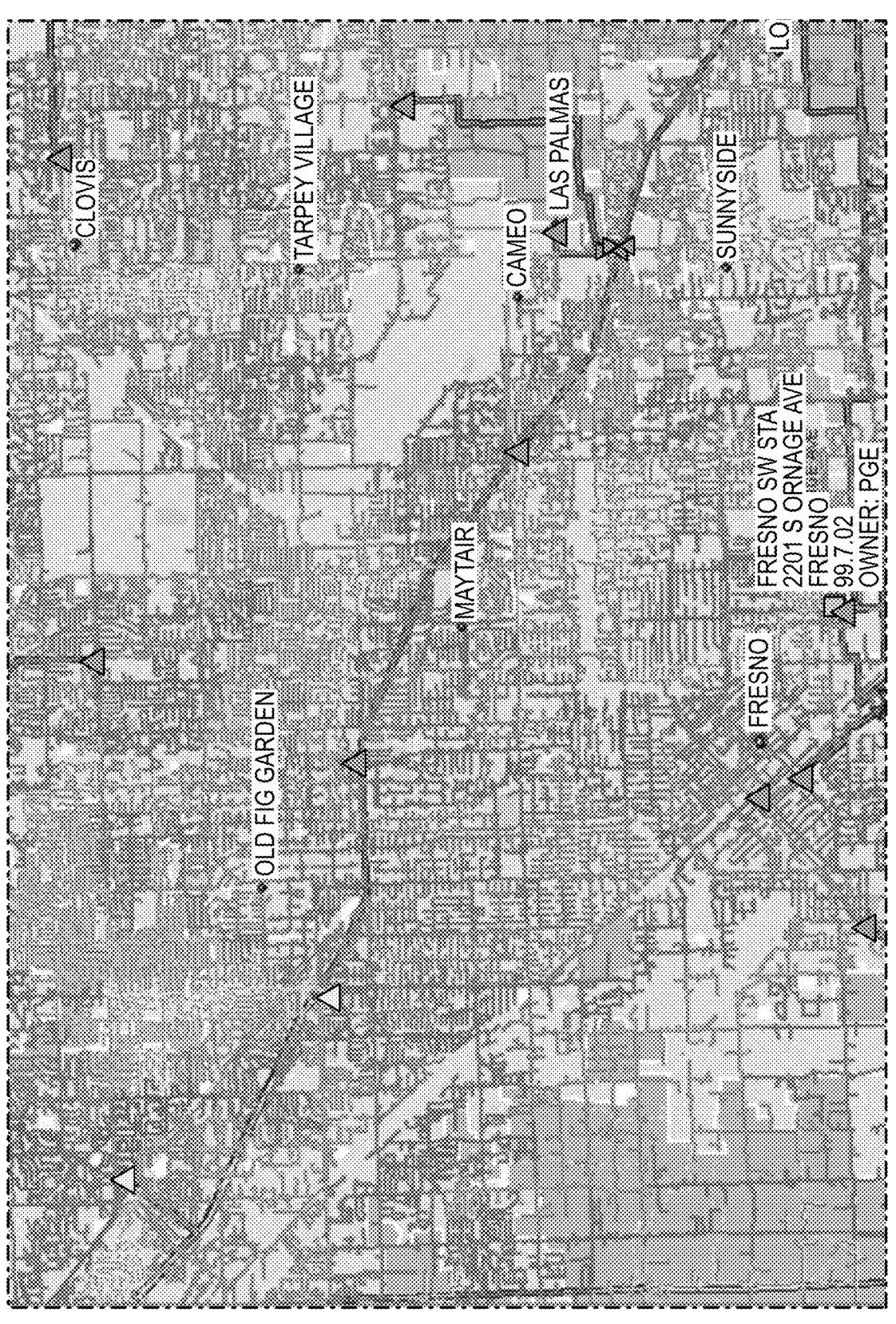

FIG. 22 depicts a map of utility asset voltage distribution according to some embodiments.

Figure 23:
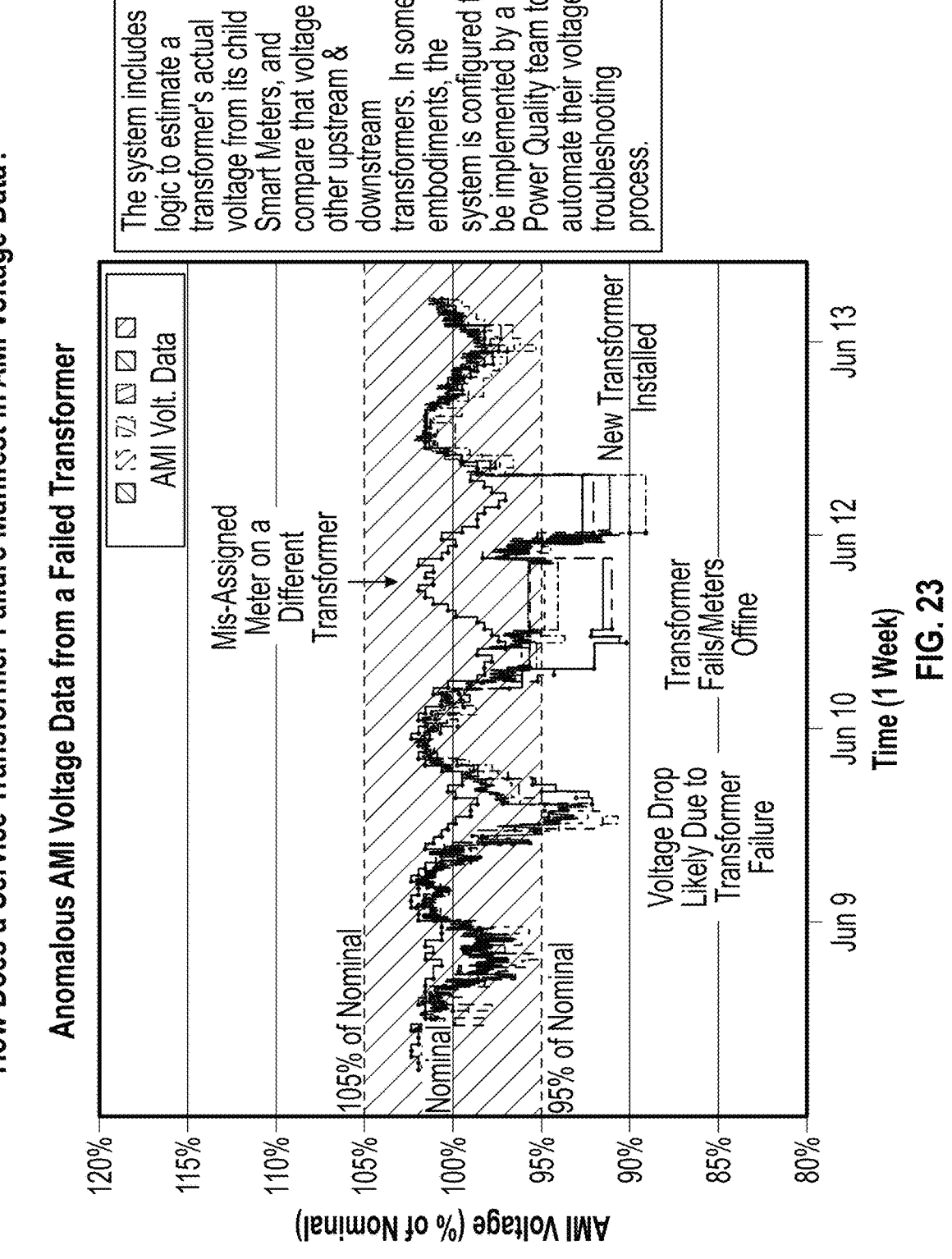

FIG. 23 shows how service transformer failure manifests in AMI voltage data according to some embodiments.

Figure 24:
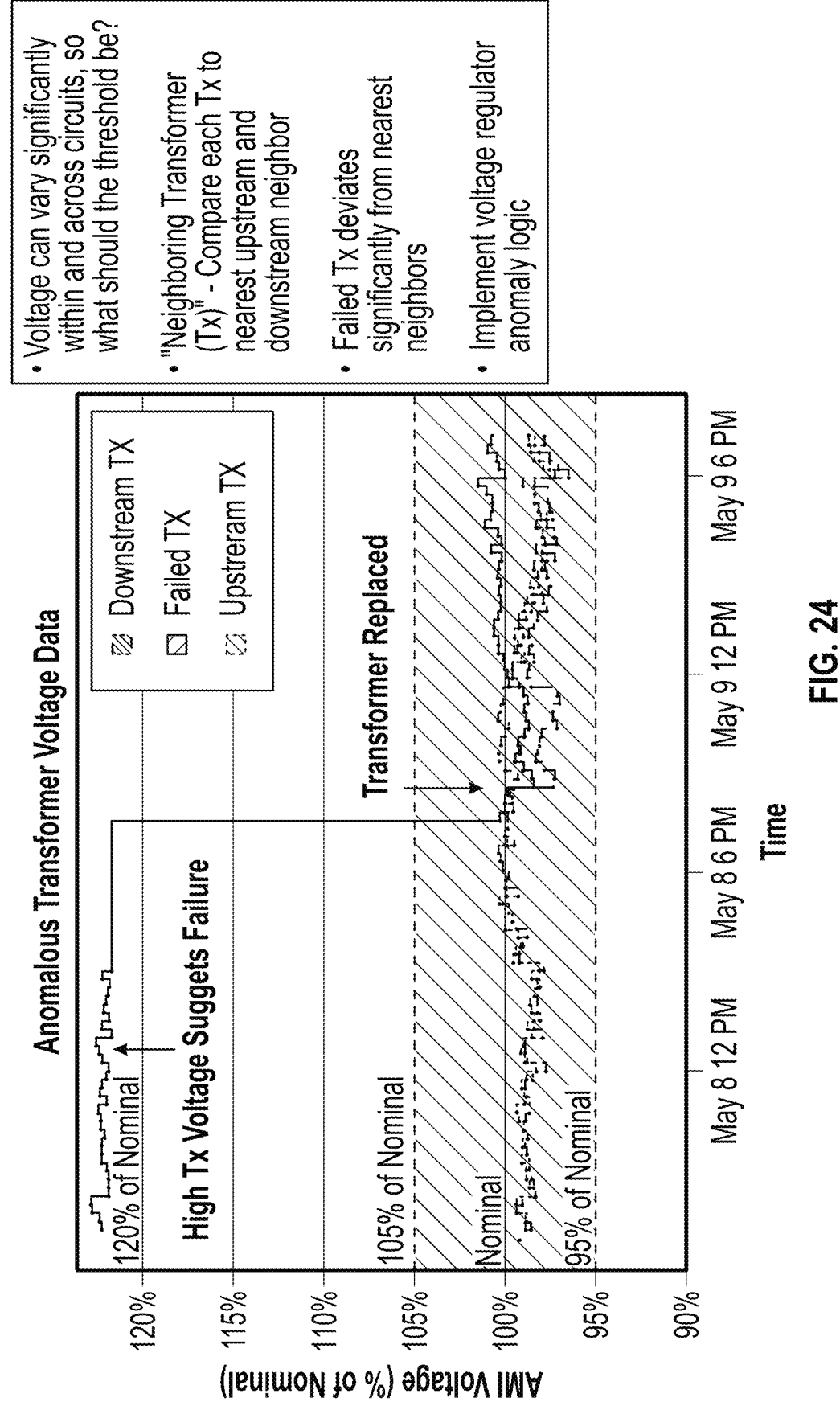

FIG. 24 illustrates how transform failure logic implementation is a complex problem with many variables in some embodiments.

Figure 25:
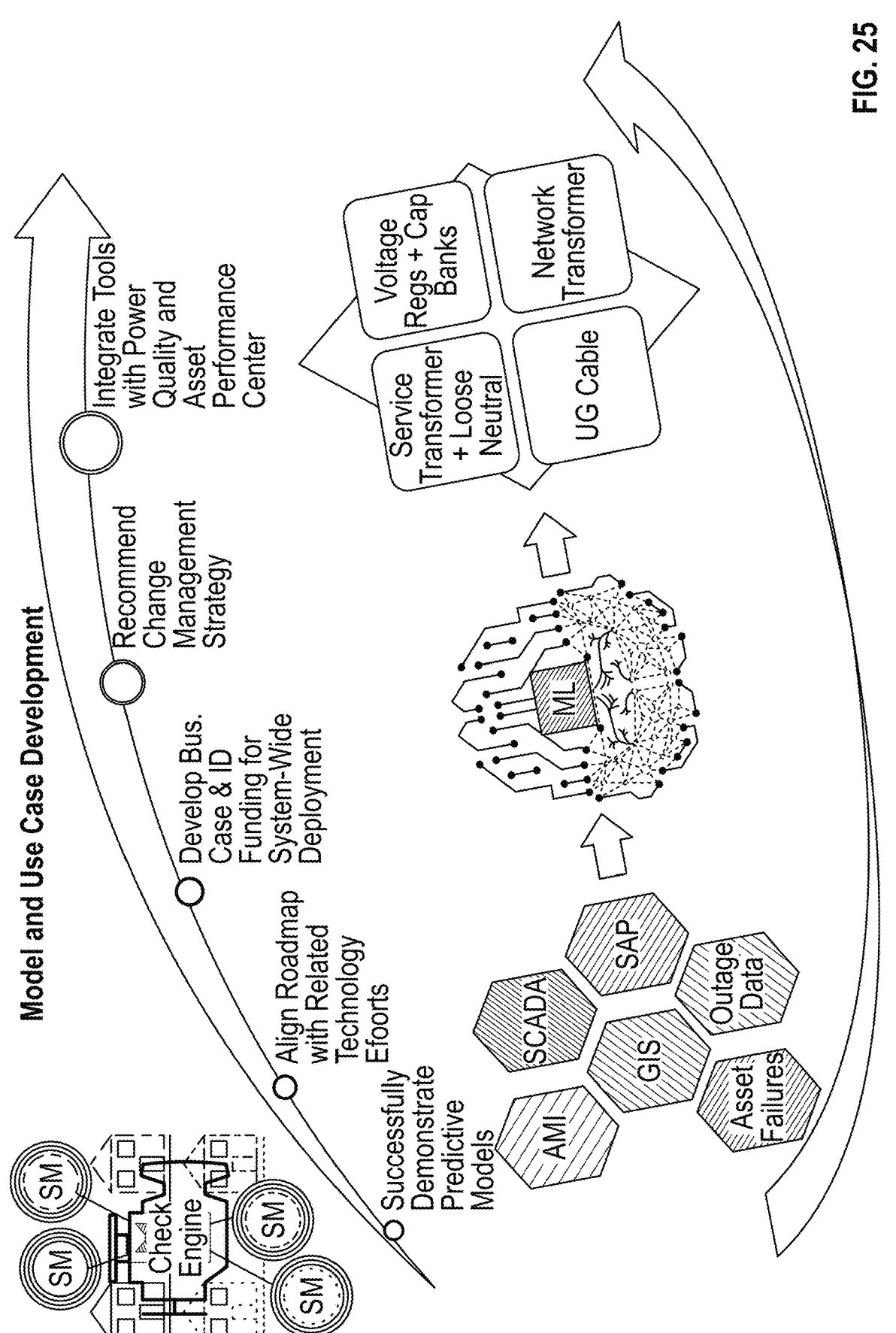

FIG. 25 shows a model and use case development according to some embodiments.

FIG. 26 shows how the system provides the benefit of reducing wildfire risk, unplanned outage cost, and customer claims according to some embodiments.

FIG. 27 depicts system data quality challenges and mitigations according to some embodiments.

FIG. 28 shows a system asset data foundation concept according to some embodiments.

FIGS. 29-41 depict data analytics executed by the system for predictive maintenance according to some embodiments.

Figure 29:
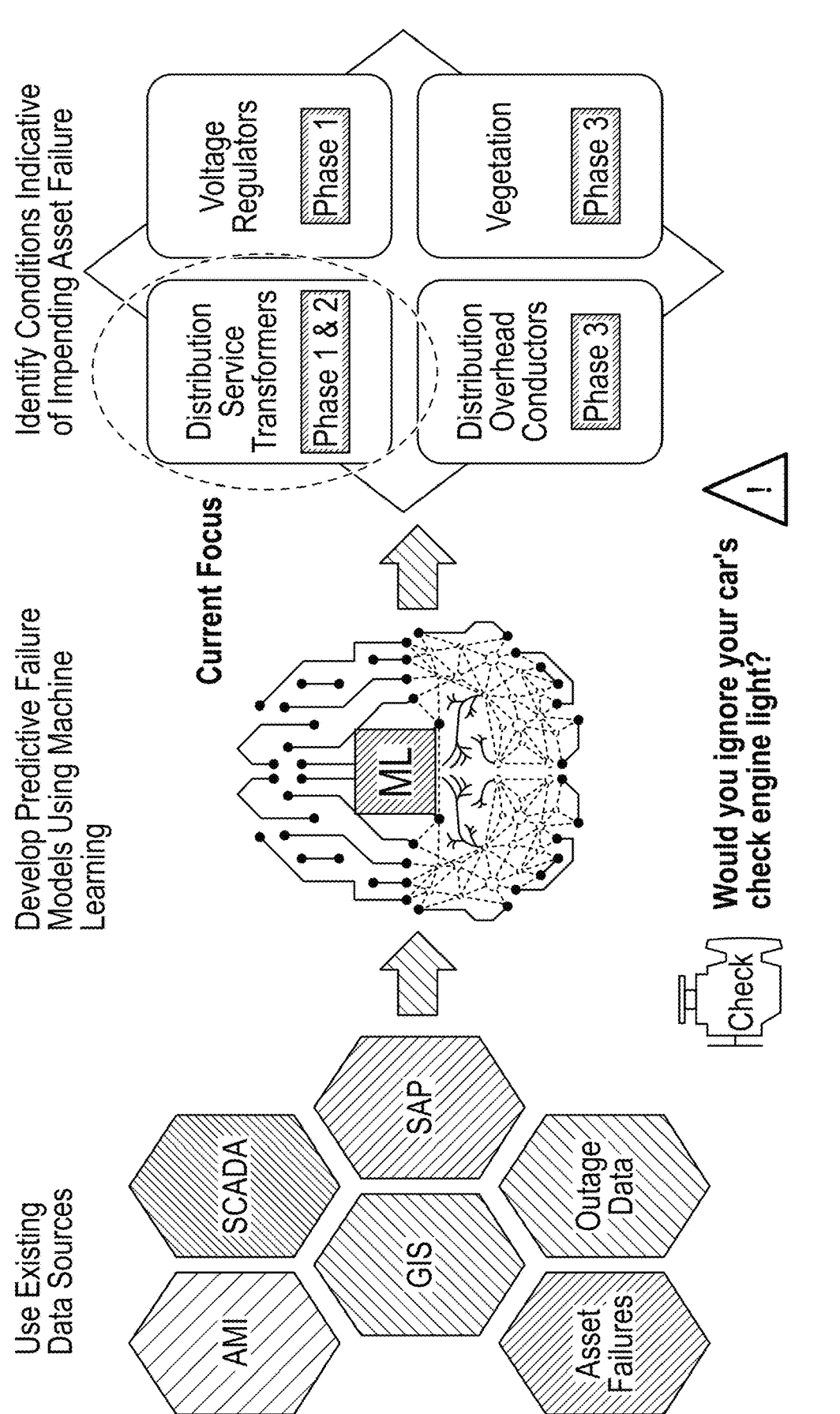

FIG. 29 shows one or more components of the system's data analytics platform according to some embodiments.

FIG. 30 illustrates one or more system steps and inputs for identifying incipient failures according to some embodiments.

FIG. 31 list various benefits provided by the system's predictive maintenance implementation according to some embodiments.

Figure 32:
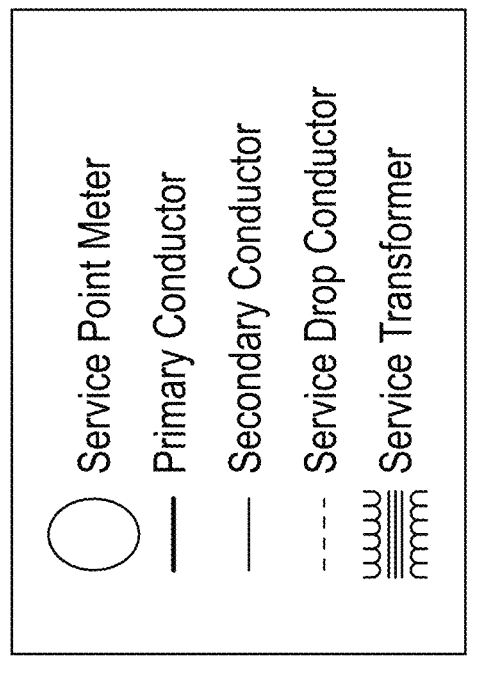

FIG. 32 shows a diagram of some assets (components) and terms used in the system according to some embodiments.

Figure 33:
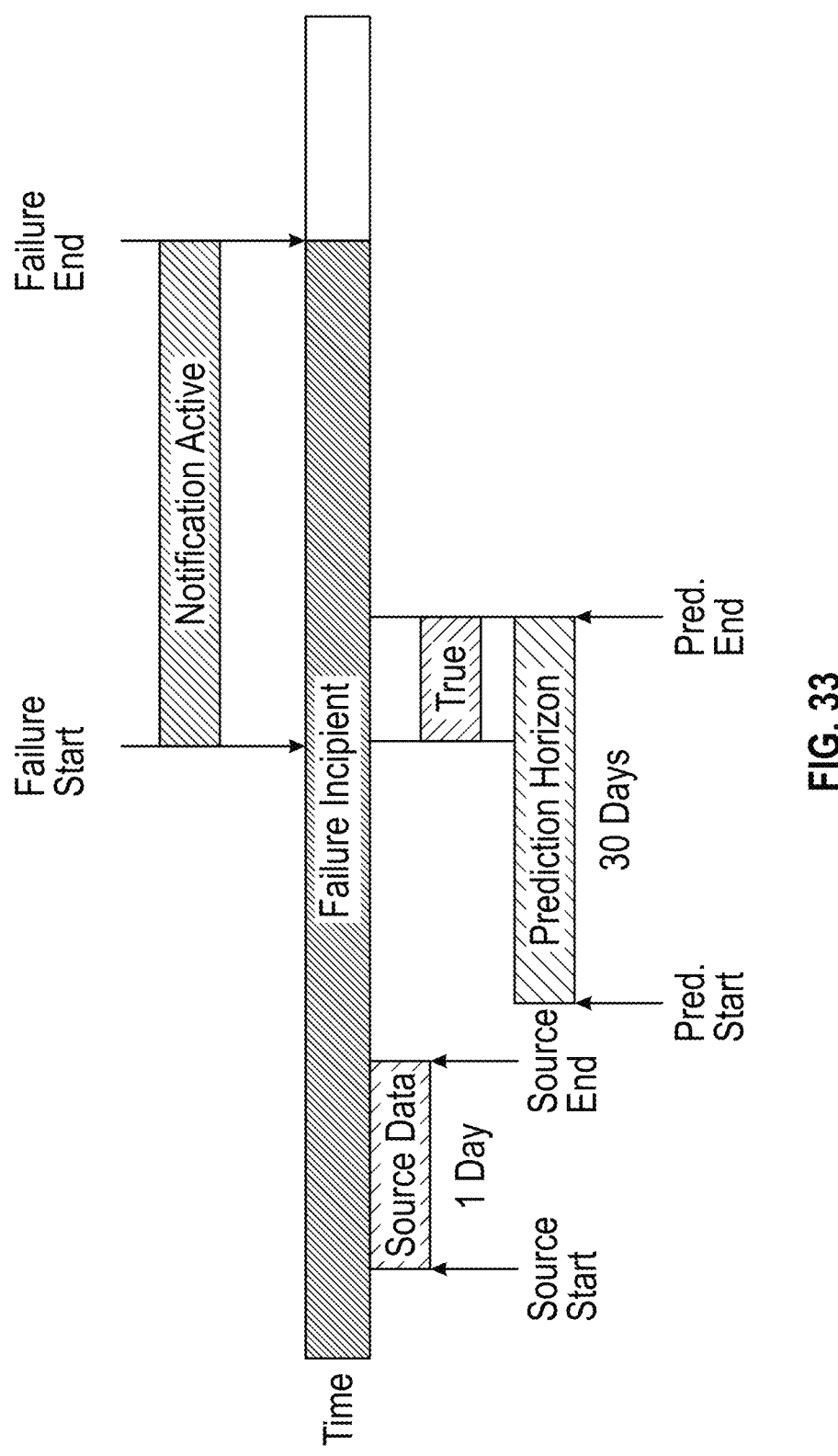

FIG. 33 shows system objectives for initial implementations by a utility according to some embodiments.

Figure 34:
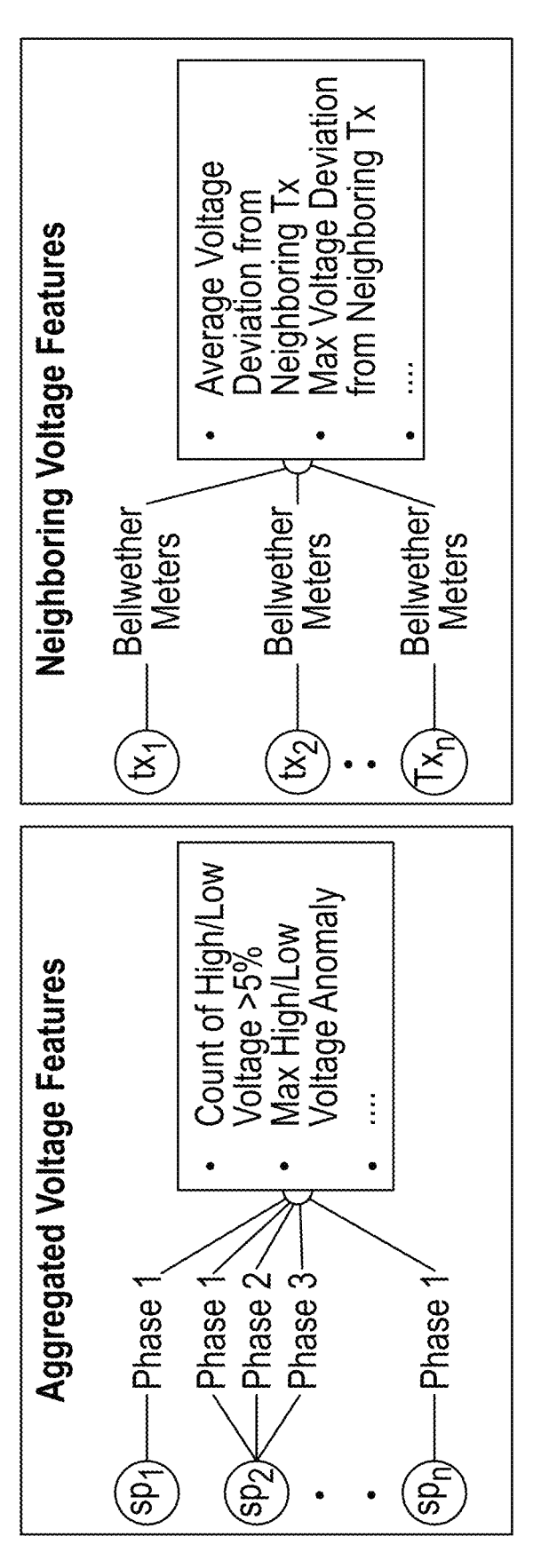

FIG. 34 illustrates how a model is developed and benchmarked with voltage anomaly features according to some embodiments.

Figure 35:
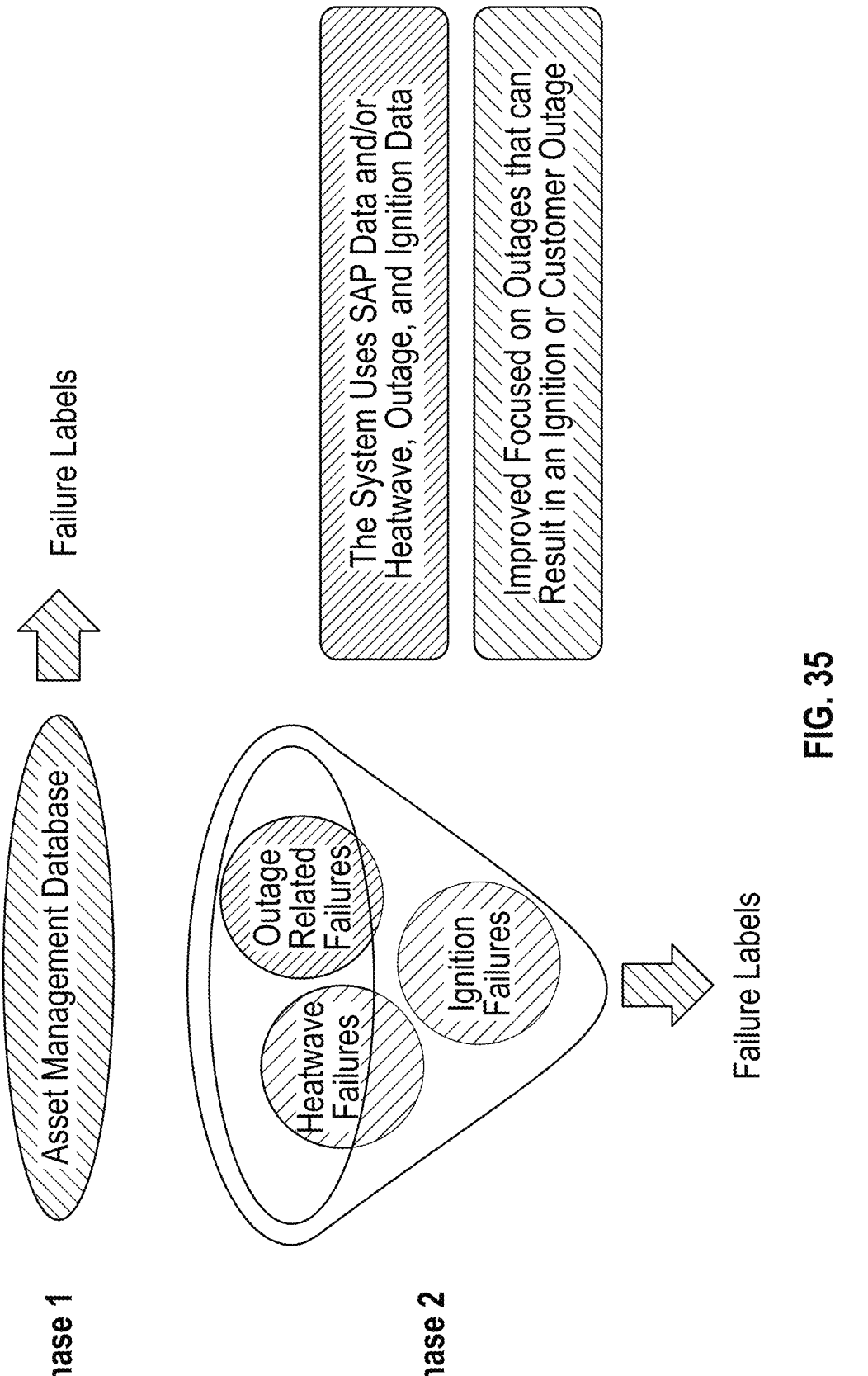

FIG. 35 shows finding ground truth in different phase implementations of the system according to some embodiments.

Figure 36:
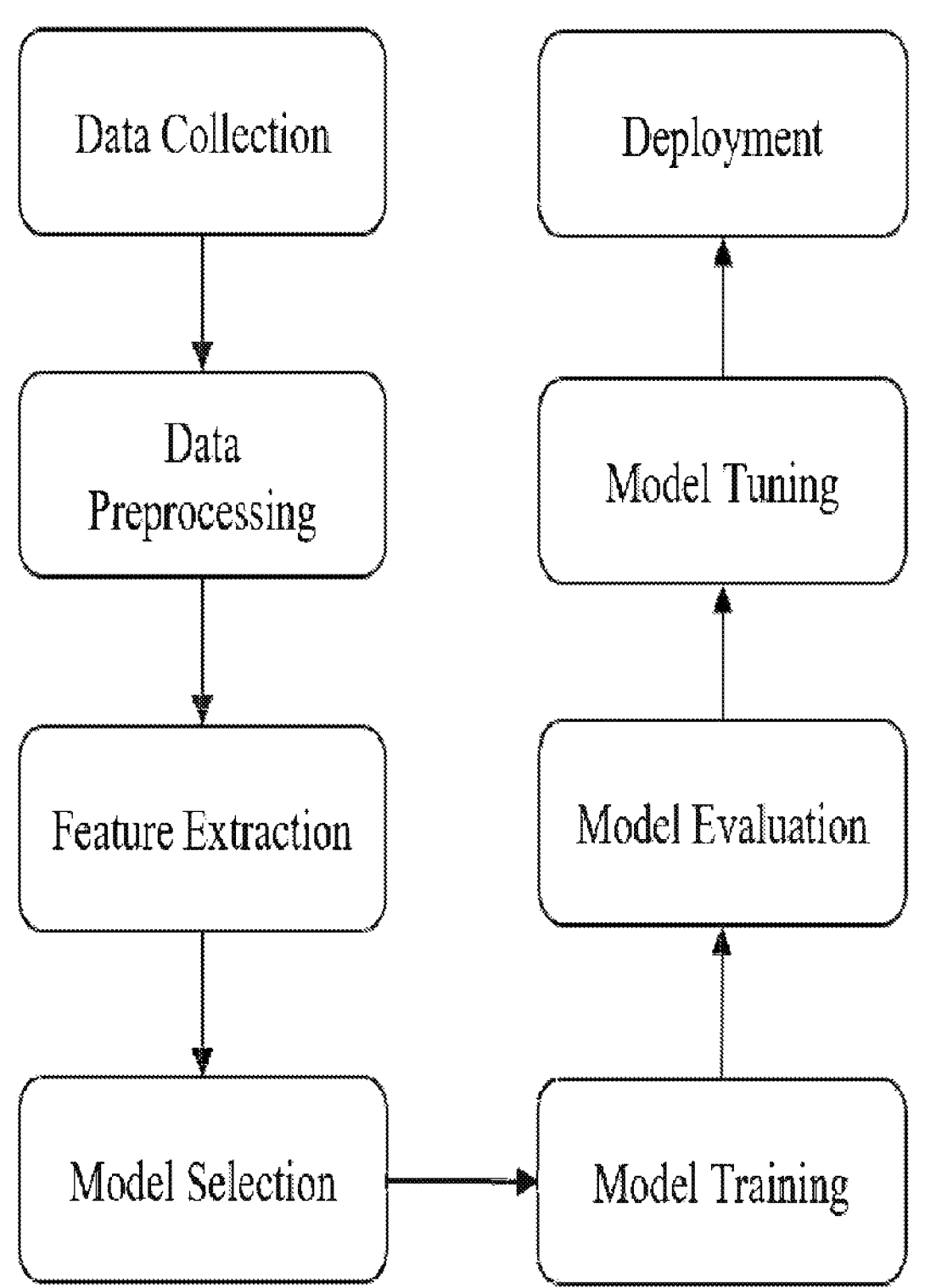

FIG. 36 shows steps for creating an artificial intelligence model according to some embodiments.

Figure 37:
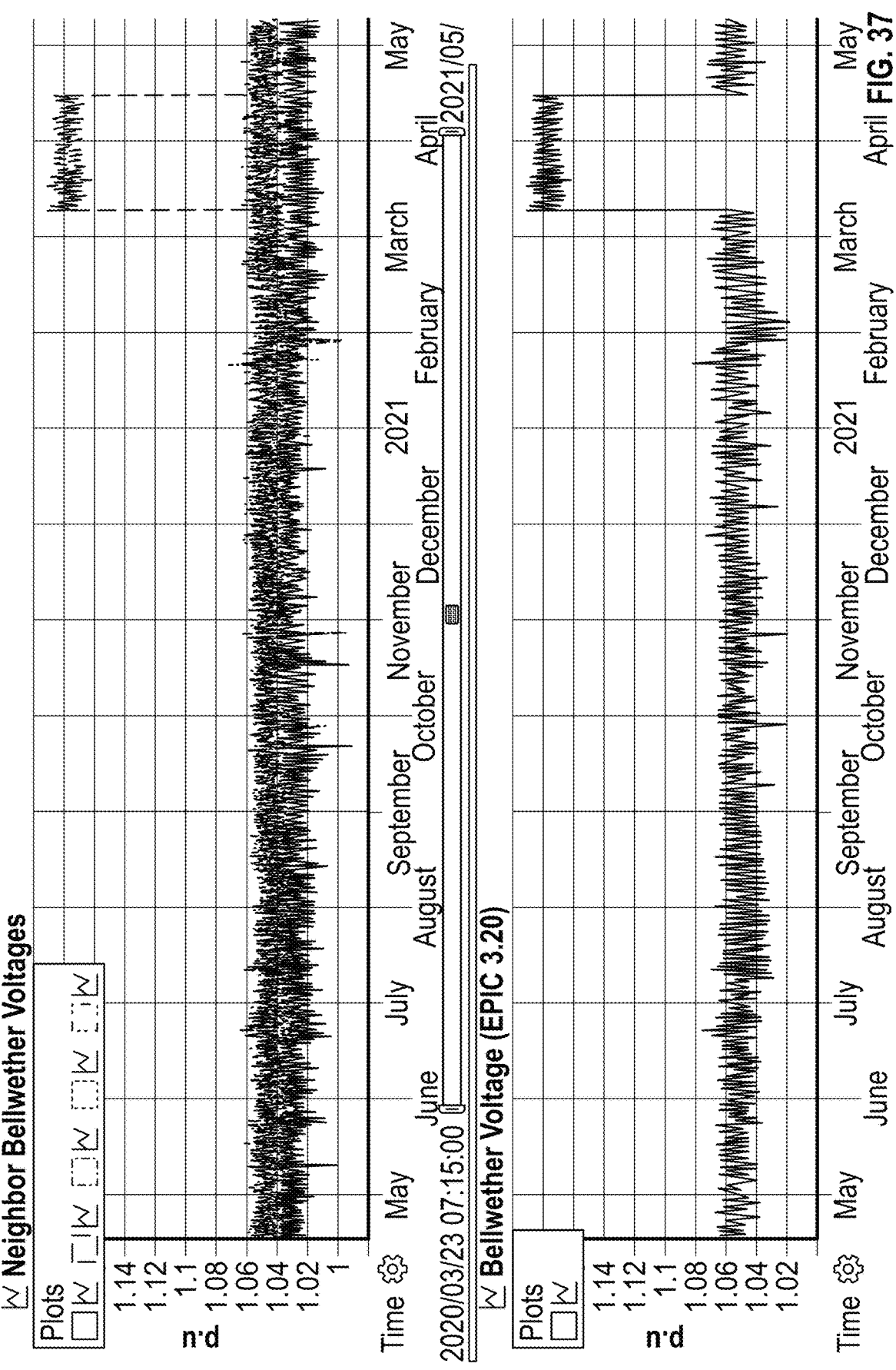

FIG. 37 shows system identification of a potential windings failure after a lightning event according to some embodiments.

Figure 38:
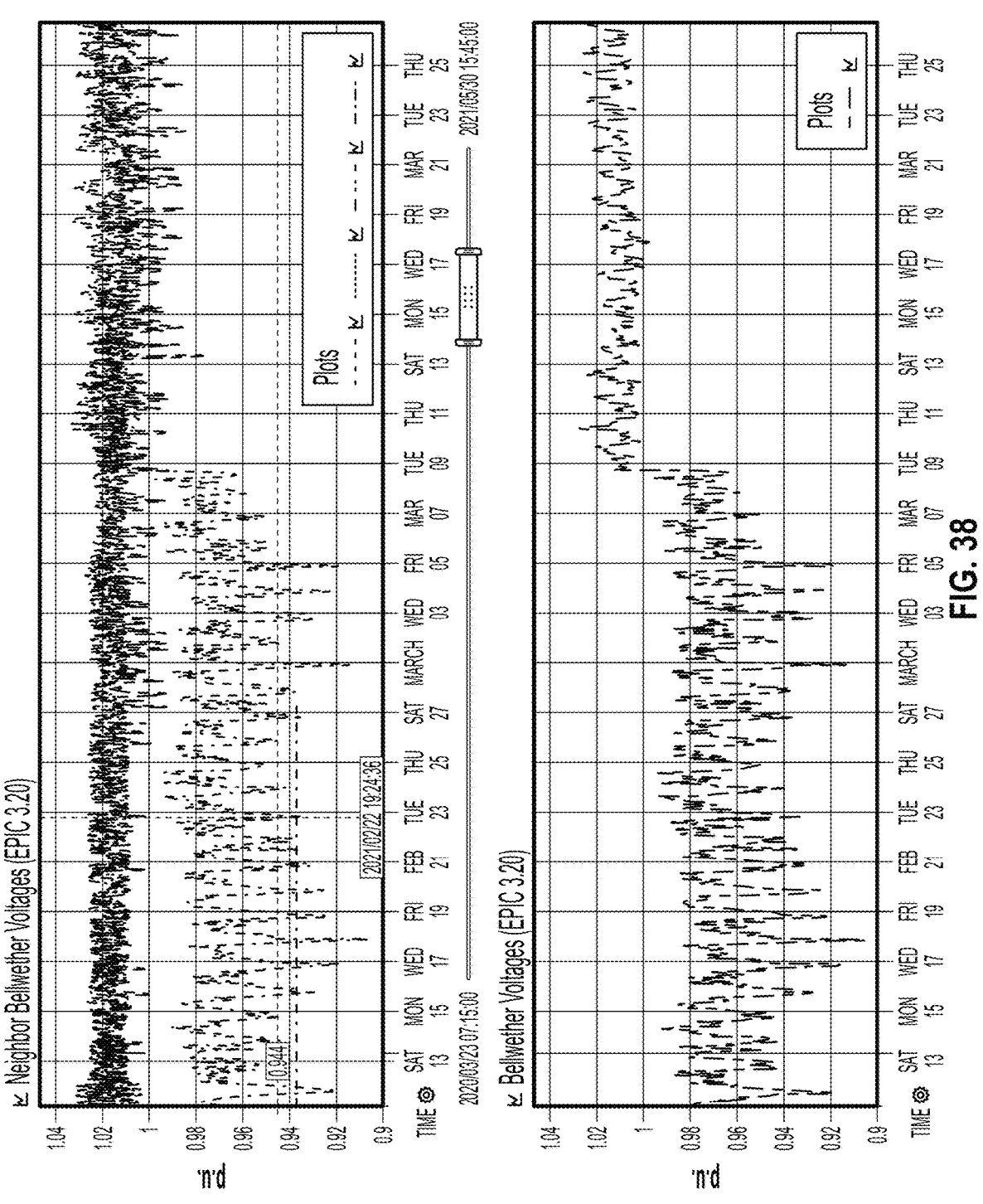

FIG. 38 shows a system identification of a potential energy theft according to some embodiments.

Figure 39:
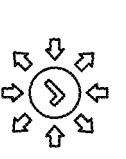

FIG. 39 shows steps for system implementation and refinement by a utility according to some embodiments.

Figure 40:
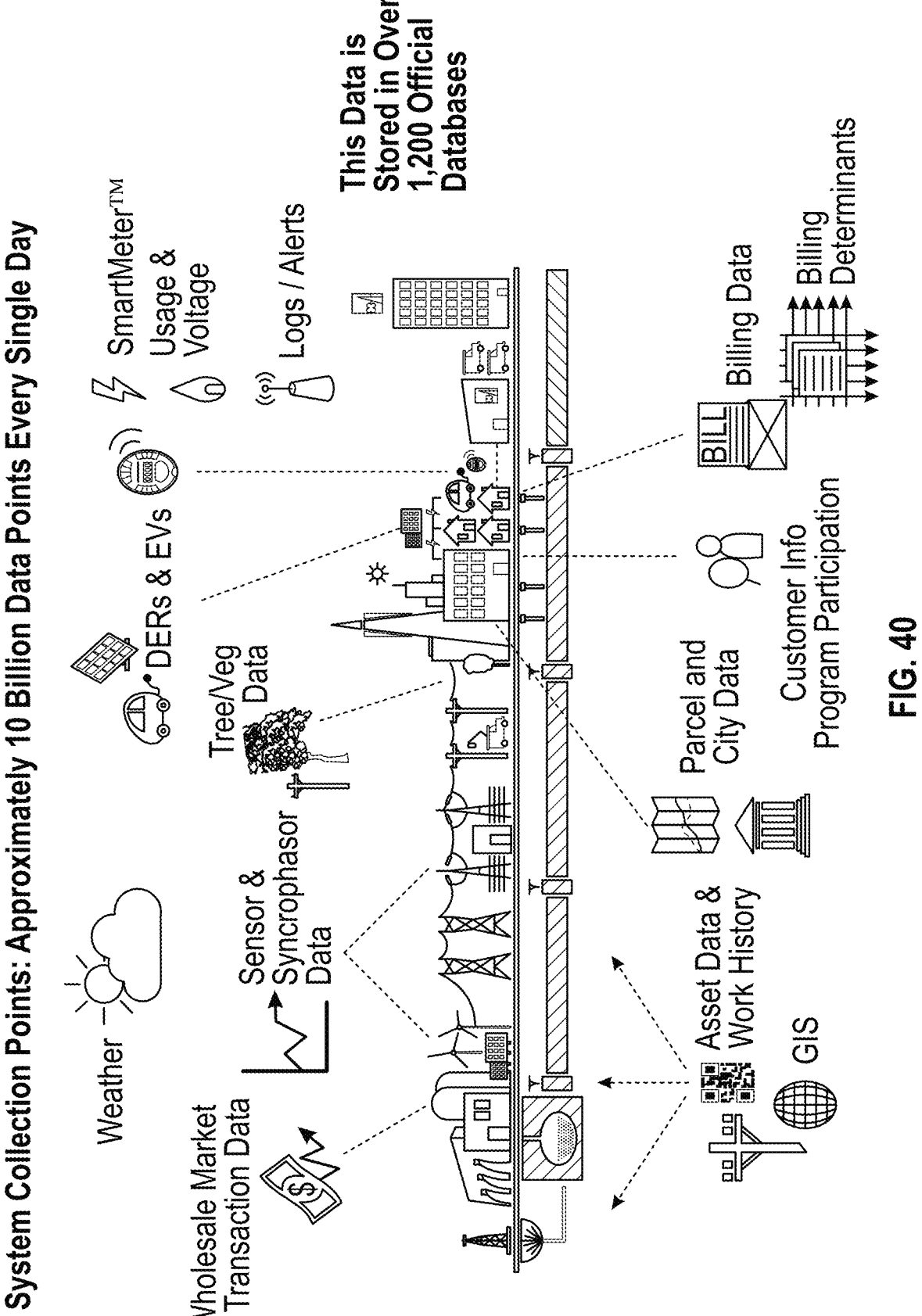

FIG. 40 shows various subsystems that the system uses to collect data inputs according to some embodiments.

Figure 41:
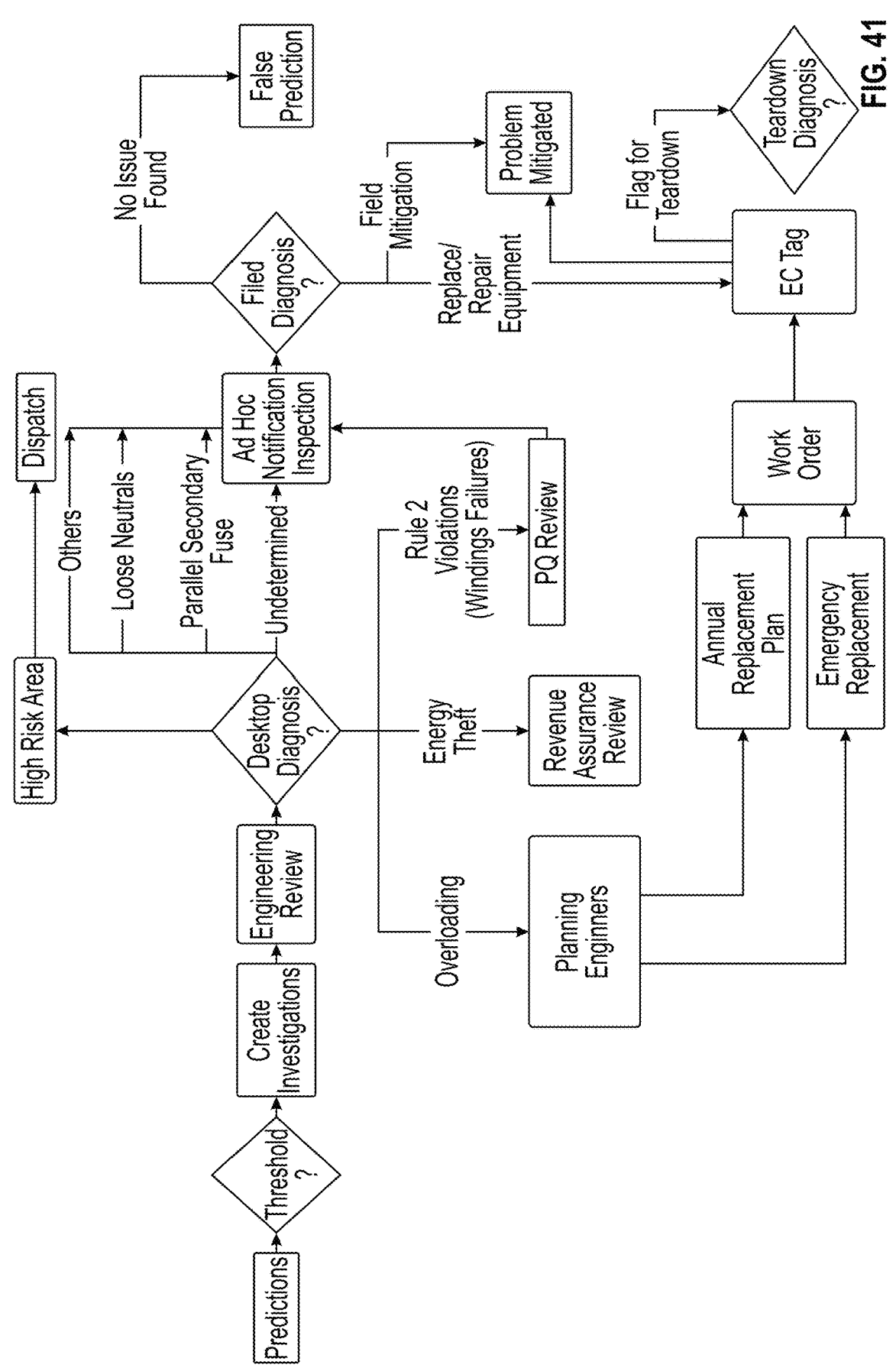

FIG. 41 shows a flowchart for implementing corrective action for various type of identified anomalies according to some embodiments.

Figure 42:
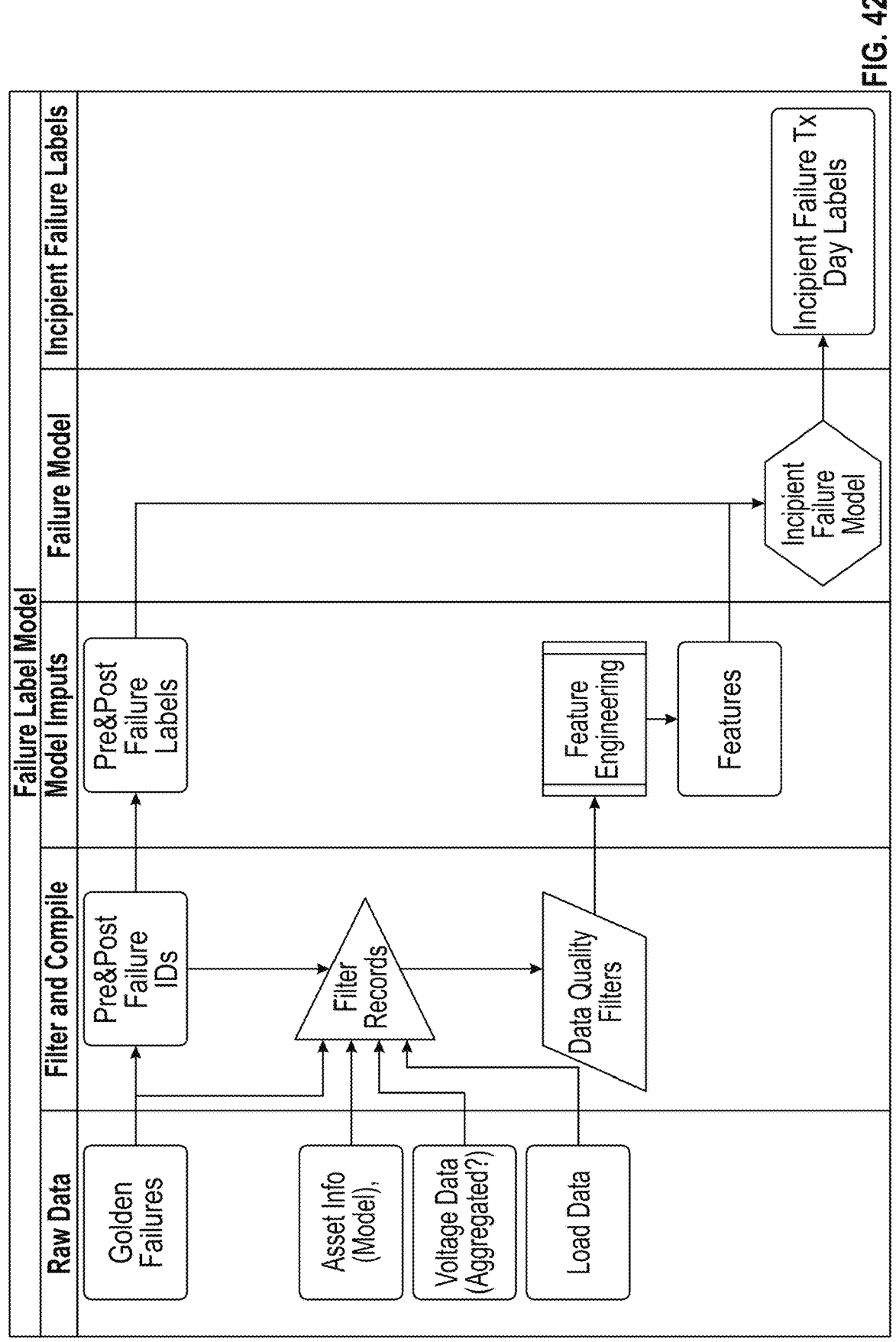

FIG. 42 shows a flowchart for creating a transformer incipient failure day labels according to some embodiments.

Figure 43:
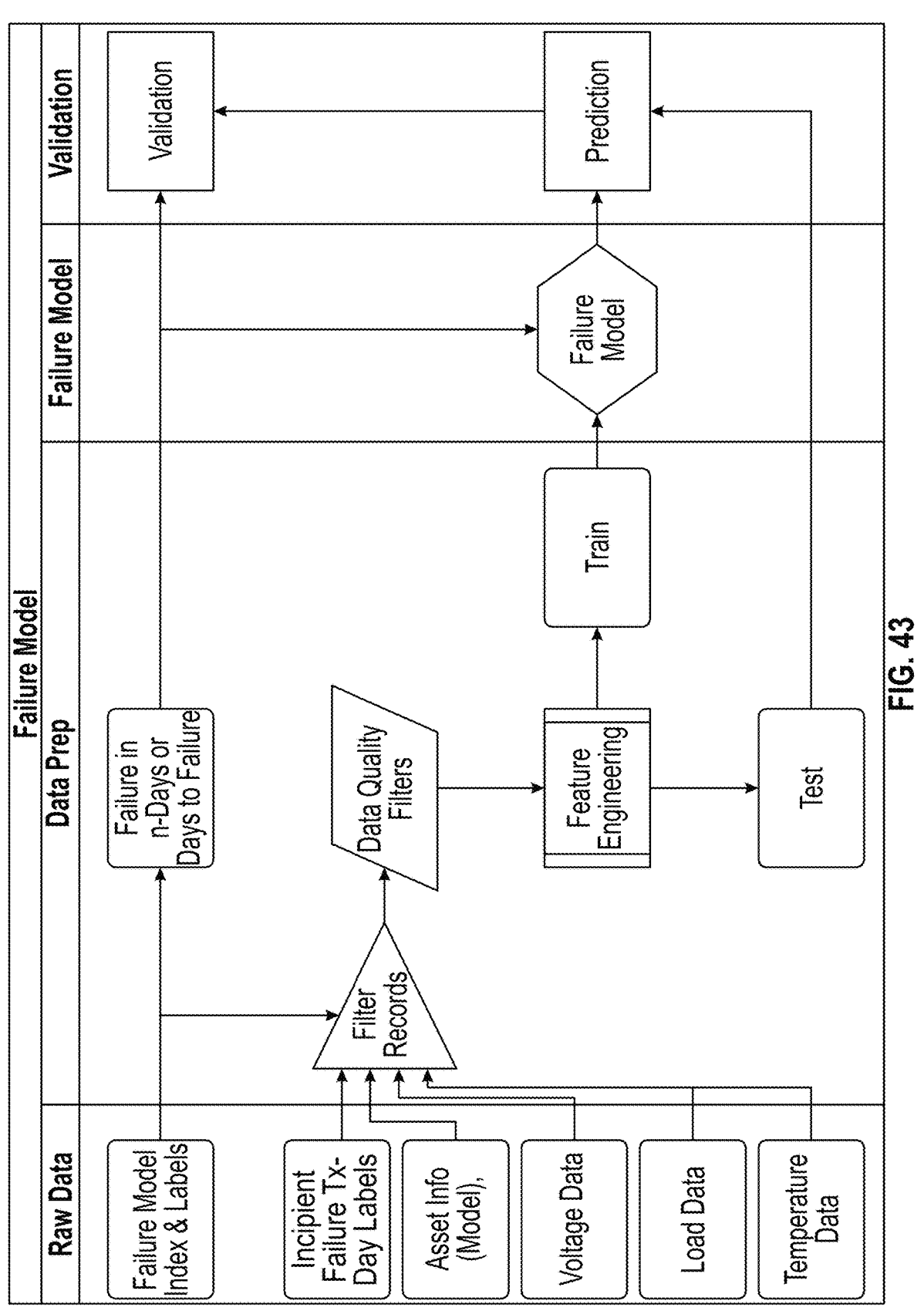

FIG. 43 illustrates inputting transformer incipient failure day labels for prediction and validation according to some embodiments.

Figure 44:
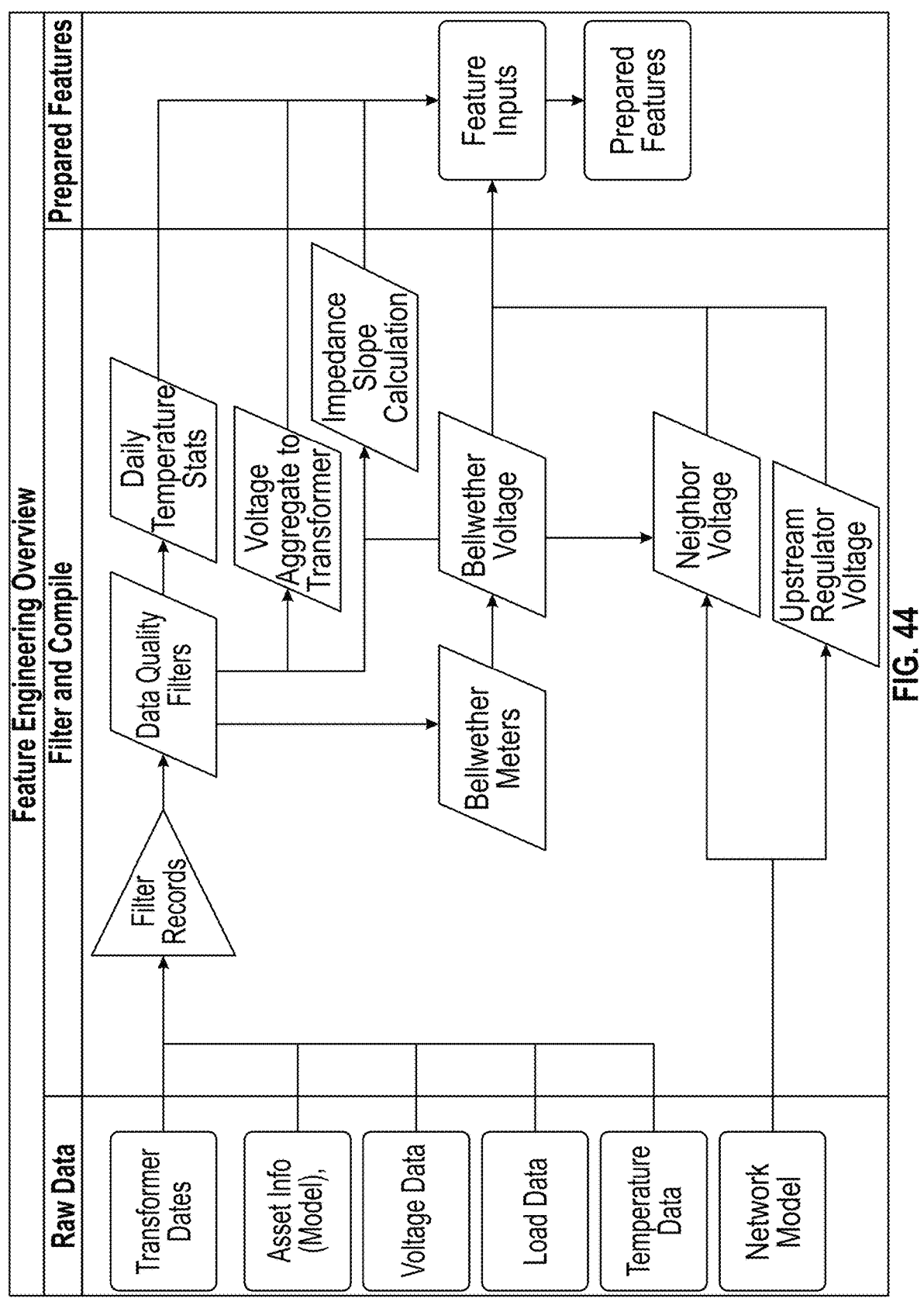

FIG. 44 illustrates filtering and compiling to generate prepared features according to some embodiments.

Figure 45:
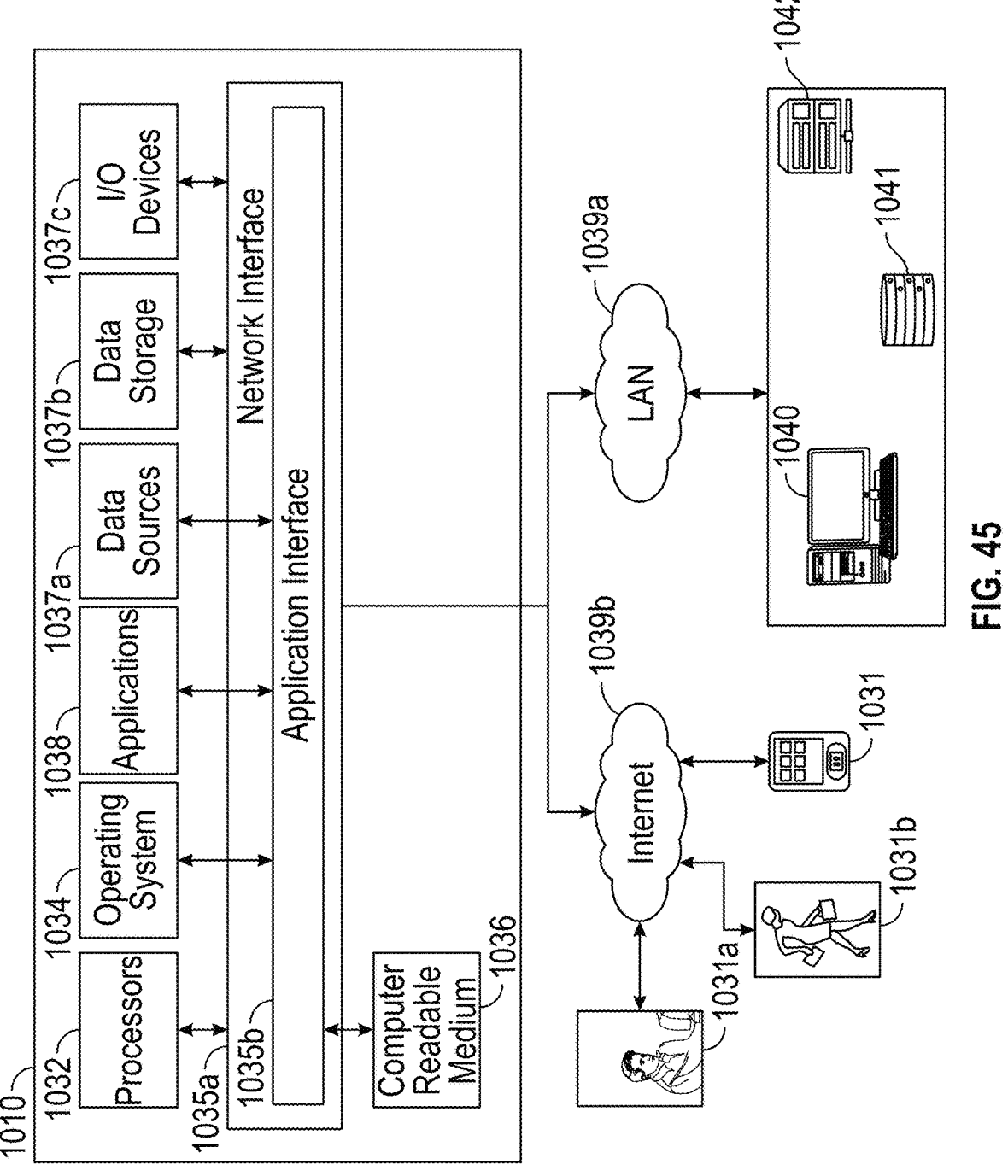

FIG. 45 shows a computer system 1010 enabling or comprising the systems and methods in accordance with some embodiments of the system.

DETAILED DESCRIPTION

In some embodiments, the disclosure is directed to systems and methods (the "system") for using sensor data and advanced analytics to predict imminent failure of a utility asset (e.g., transformer, meter, etc.) in an electrical distribution system. As used herein, a "utility" is an electricity provider that creates, monitors, and/or delivers electricity from an electrical power plant to a business or residence, although the innovations described herein can be used in a wide variety of utility and non-utility systems. As used herein as non-limiting examples, an "asset" is a component of an electrical distribution system, and can include, as non-limiting examples generators, towers, transformers, power lines, computer modules, and/or any conventional equipment associated with a utility.

Predictive maintenance is most akin to a check engine light, which identifies when something in your vehicle is outside of normal operating conditions but has not yet led to your car being inoperable. This approach optimizes all three elements in some embodiments: reliability, affordability, and risk by identifying potential failures before they occur allowing for the re-routing of power or in some cases hot asset replacement (reliability), ensures assets are utilized through their entire useful life (affordability), and stops failures—including those that could lead to wildfire ignitions or other safety incidents—from occurring all together (risk).

In some embodiments, the system includes a predictive failure model that includes at least one or more of the following inputs: smart meter voltage, electric distribution network configuration data, historical smart meter peak and average loading, historical ambient temperature, and historical failure records.

In some embodiments, the system includes artificial intelligence. In some embodiments, artificial intelligence includes a machine learning (ML) classification model that is trained against historical failures to develop a prediction for the probability of equipment failure for a given time frame. In some embodiments, the system includes a data preparation and modelling technique that is unique and novel in that it does not require accurate transformer phase connection information to be effective. In some embodiments, the system is configured and to identify and/or predict one or more different failure modes. In some embodiments, failure modes include, as non-limiting examples, windings failures, loose neutrals, overloading, energy theft, and/or any conventional failure mode of a utility asset. In some embodiments, the system is applicable to utility systems with high amounts of distributed solar generating systems.

In some embodiments, data preparation includes determining nominal voltage levels. In some embodiments, nominal voltage levels are inferred using utility meter form and voltage summary statistics. In some embodiments, the system is configured to normalize smart meter voltages against their nominal voltage levels. In some embodiments, based on the smart meter form, the system is configured to use data quality rules to filter meter failures and irrelevant measurement channels.

In some embodiments, data preparation includes bellwether voltage data. As used herein, bellwether voltage is defined as the representative voltage of one or more transformers upstream and/or downstream from a transformer of interest. In some embodiments, a representative voltage is defined as the voltage of the low side (secondary conductor) of a transformer calculated using voltage readings from smart meters fed by the transformer. In some embodiments, the system is configured to identify a one or more representative meters (e.g., a pair of meters) for a given transformer by finding meters with the highest voltage over a period, and thus the lowest assumed impedance to the transformer. In some embodiments, to avoid selecting meters with highest voltage due to solar generation, the system is configured to identify the highest voltage meters only during peak loading hours when the sun is down.

In some embodiments, meters which have been flagged by the system as potential misassignments are excluded from the analysis. In some embodiments, the system is configured to exclude channels which have statistically significant and/or sustained anomalies from the analysis, such that meter failures and common fuse failures are not included.

In some embodiments, the system includes feature generation. In some embodiments, feature generation includes aggregating one or more of (smart) meter voltage, neighbor (bellwether) transformer voltage features, loading data, and historical temperature data.

In some embodiments, aggregating meter voltage includes configuring the system to aggregate the prepared raw and bellwether smart meter voltage across days. In some embodiments, the system is configured to generate summary statistics across all measurements, such as mean, range and/or any conventional statistics of interest. In some embodiments, the system is configured to send, by one or more processors, the summary statistics to an AI model as training data and/or for prediction.

Figure 1:
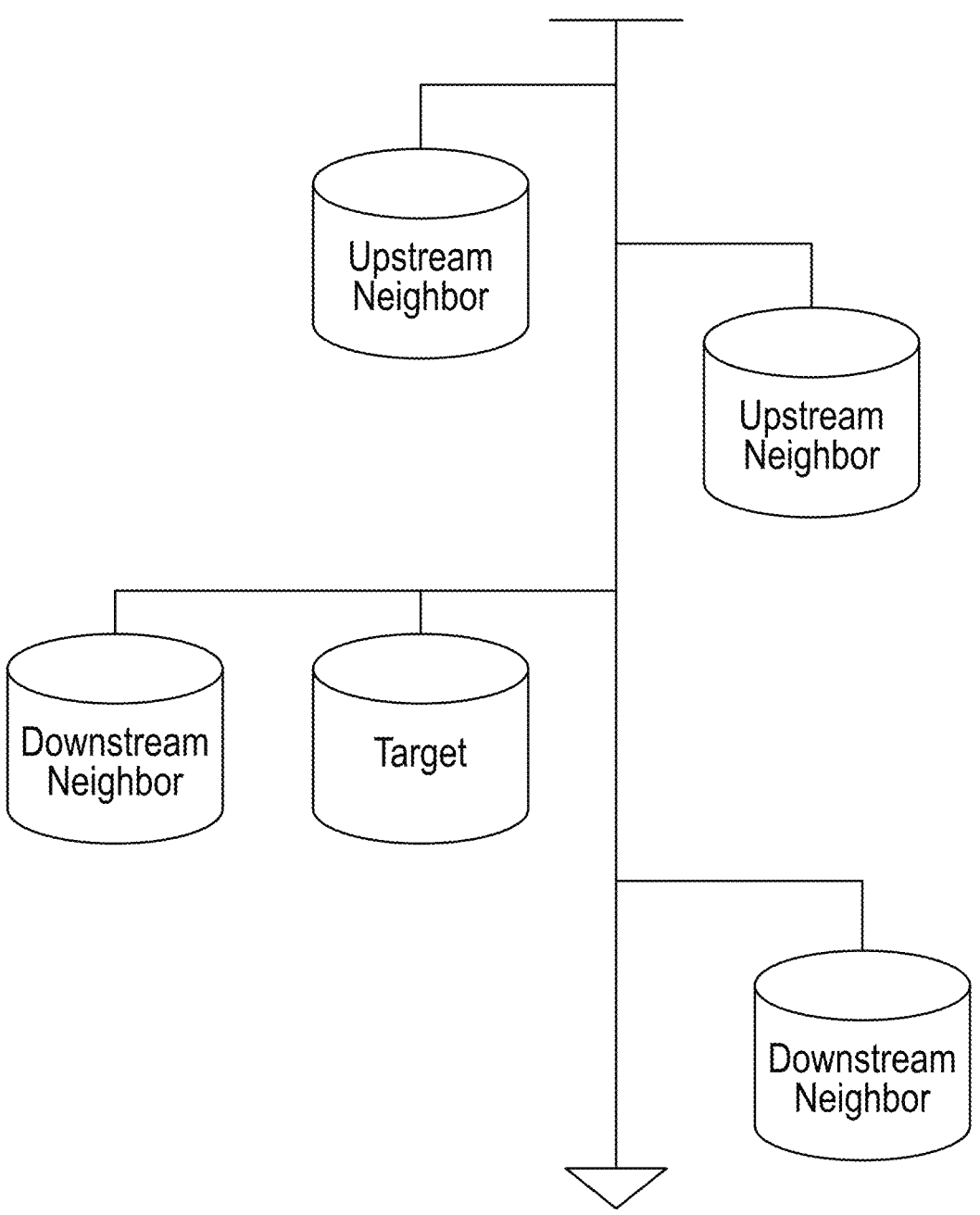
FIG. 1 illustrates neighboring transformers on an electrical utility grid.

In some embodiments, aggregating certain neighbor (bellwether) transformer voltage features include, for each transformer, configuring the system to identify several other neighbor transformers which are electrically close using utility network configuration information. In some embodiments, the system is configured to only select neighbor transformers that have similar voltage for the aggregation. In some embodiments, the system is configured to use any neighbor transformer regardless of phase for the aggregation. In some embodiments, the system is configured to create summary statistics for upstream and downstream neighboring bellwether voltages for the neighboring transformers. In some embodiments, the system is configured to compare the target transformer voltage to the average upstream transformer bellwether voltages, and the neighbor transformers with the closest voltage measurements. In some embodiments, the use of one or more neighbor transformers and identification of the closest voltage relationship by the system makes it possible for the system to identify anomalies without necessarily having accurate phasing information. FIG. 1 illustrates the concept of neighboring transformers on an electrical utility grid. In some embodiments, the target is the transformer of interest, where one or more smart meters electrically coupled to the upstream and/or downstream neighbor transforms provide the bellwether voltage for the analysis.

In some embodiments, feature generation includes loading data. In some embodiments, the system is configured to collect transformer historical peak and average loading as a percent of seasonal transformer capability for varying periods of time. In some embodiments, the system is configured to use historical peak and average loading to develop features which capture the history of loading on the component. This allows the system to exclude variations that fit a pattern model according to some embodiments.

In some embodiments, feature generation includes historical temperature data. In some embodiments, the system is configured to capture temperature summary statistics using weather reports and/or meteorological towers that are near (e.g., less than 50 miles) a transformer. In some embodiments, the system is configured to correlate the temperature summary statistics to component failure. In some embodiments, the system is configured to generate a seasonal component of failure characteristics using the temperature summary statistics.

In some embodiments, the system is configured to collect and store failure data. In some embodiments, the system is configured to collect failure data from one or more outage and work management systems. In some embodiments, the system is configured to use the failure data to develop a failure label for a series or transformer data combinations. In some embodiments, the system is configured to combine the failure labels with at least a portion of the feature generation for those dates to develop a training data set for an AI model.

In some embodiments, the system is configured to use some or all of the data collected as described herein to create a feature data set which is used to train artificial intelligence (AI) including machine learning. Embodiments described herein that are directed to a machine learning model are merely an example of implementation of the system using a subset of AI to aid those of ordinary skill in making and using the system. A reference to any subset of AI is not limiting and does not exclude the use of other types of AI to implement various aspects of the system. A general reference to a/the system "model" includes one or more subsets of AI. Depending on specific system configurations according to some embodiments, additional features described herein may be included, or specified features may be excluded to train a model.

In some embodiments, training and/or calibrating the model includes one or more stages. In some embodiments, training and/or calibrating the model includes a two-stage process. In some embodiments, a first stage includes developing a balanced training set which includes data sampled prior to component failures and randomly sampled non-failure data to create a pre-fit trained model. In some embodiments, the pre-fit trained model is then used to train a calibrated model against a time series of regularly spaced times with sampled failed and non-failed assets.

In some embodiments, the model includes balanced and/or imbalanced training data. In some embodiments, incipient behavior may or not be present n-days prior to a failure. In some embodiments, failures with incipient behavior are relatively rare (less than 0.5%). In some embodiments, a balanced data set has been generated from known failures, and a sample of normal behavior. In some embodiments, to calibrate the model, a more representative distribution is desired, so a data set using a different sampling approach is generated. In some embodiments, cross validation and training test splits are disjoint across both datasets.

Figure 2:
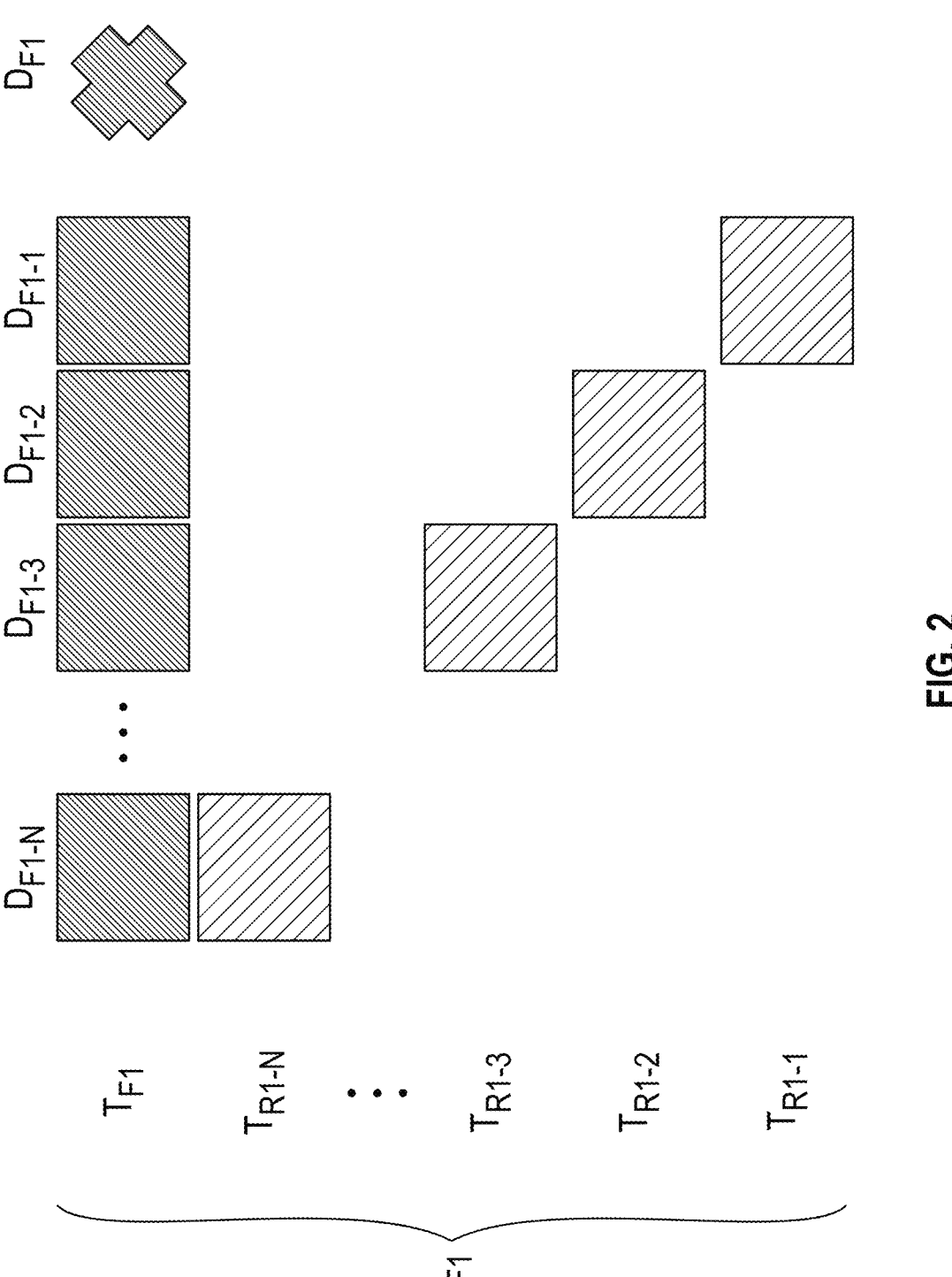
FIG. 2 illustrates a non-limiting example of training data according to some embodiments.

FIG. 2 illustrates a non-limiting example of training data according to some embodiments. In some embodiments, for each failure date ($D_F$) in a given a set of failed transformer ($T_F$) dates, the system is configured to generate a list of predecessor dates $D_{F1-N}$ through $_{DF1-1}$ where incipient failure behavior was present. Initially, this is assumed to be a constant N days according to some embodiments. In some embodiments, for each day, the system is configured to select a random transformer ($T_R$) on the same feeder F in order to provide a baseline transformer performance for comparison.

In some embodiments, for the purposes of cross validation, the system is configured to generate a cross validation (CV) group attribute which maintains individual substations and feeders in separate cross validation groups. In some embodiments, dates are not initially separated. In some embodiments, when 2 or more years of data is available to the system, model training and testing includes different years of data. In some embodiments, this generates a list of balanced samples and maximizes use of failure data.

Figure 3:
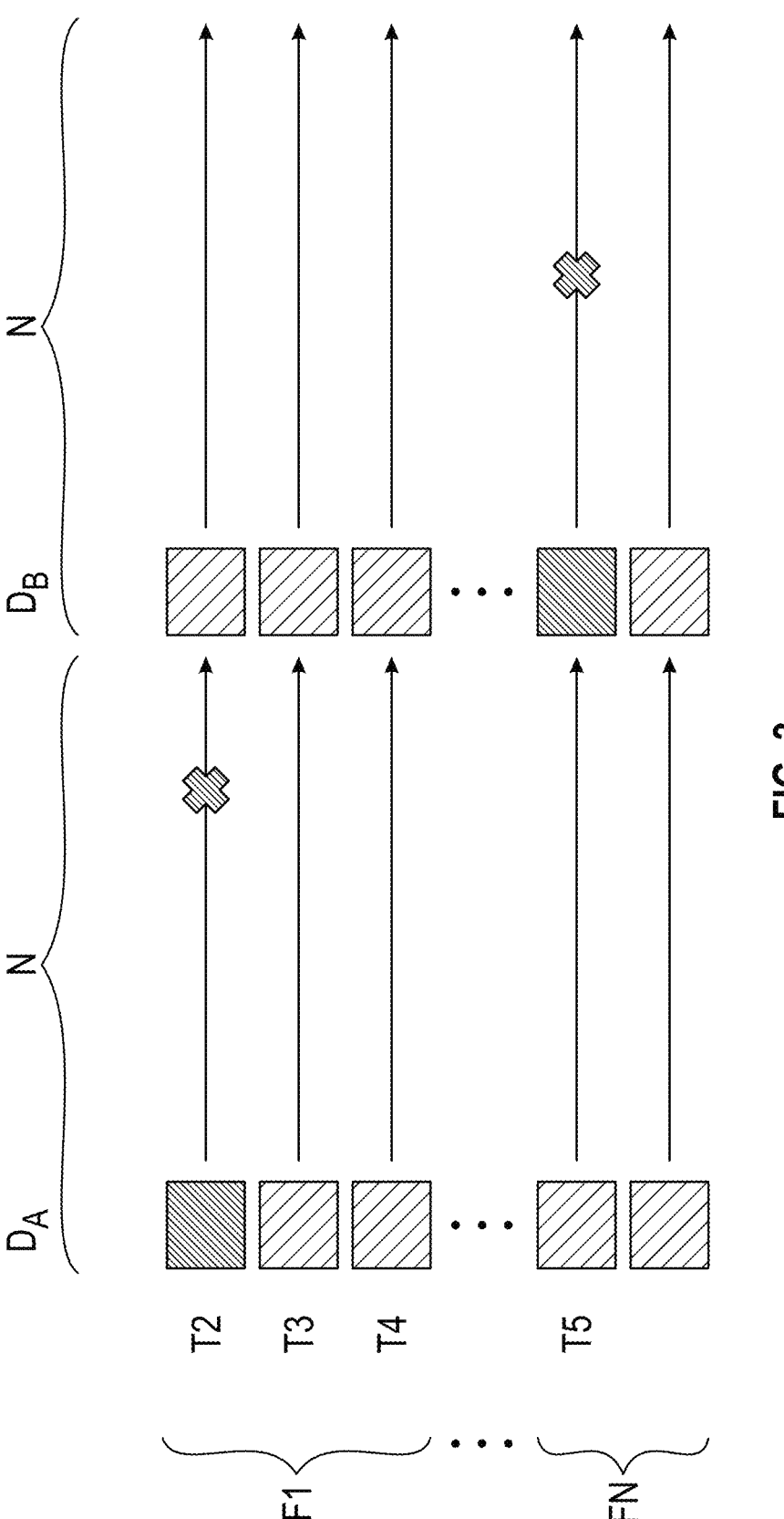
FIG. 3 depicts calibration data according to some embodiments.
Figure 4:
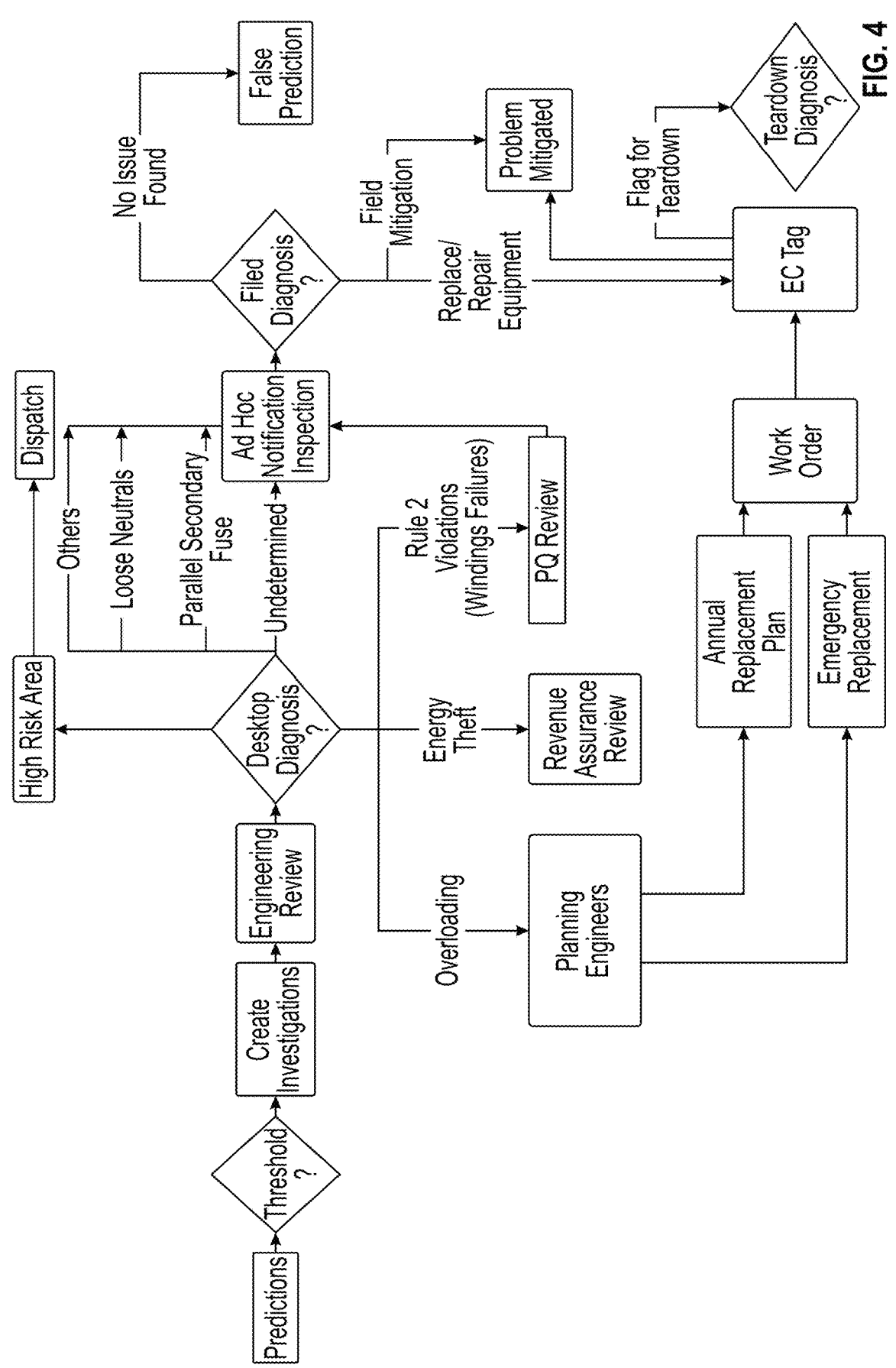
FIG. 4 shows a flowchart for a method of implementing corrective action for various types of identified anomalies according to some embodiments.

FIG. 3 depicts calibration data according to some embodiments. In some embodiments, the system includes calibration data that includes a sampled sequence over a specified time period. In some embodiments, the calibration data includes a sample of time (e.g., a sequence of days) over a timespan (e.g., year) of data. In some embodiments, for each day (D), the system looks at all or a random subsample of transformers (T), and labels the transformers which fail within N days of the sampled day as a calibration data set ($D_A$, $D_B$ ... $D_N$). In some embodiments, the system includes calibrating the trained model using the calibration data set. In some embodiments, the system includes incorporating any cross-validation groupings from the original model by using feeder attributes. In some embodiments, the system includes testing against separate feeders (electrical transmission lines), and once available, a separate year of data. FIG. 4 shows a flowchart for a method of implementing corrective action for various types of identified anomalies according to some embodiments.

Figure 5:
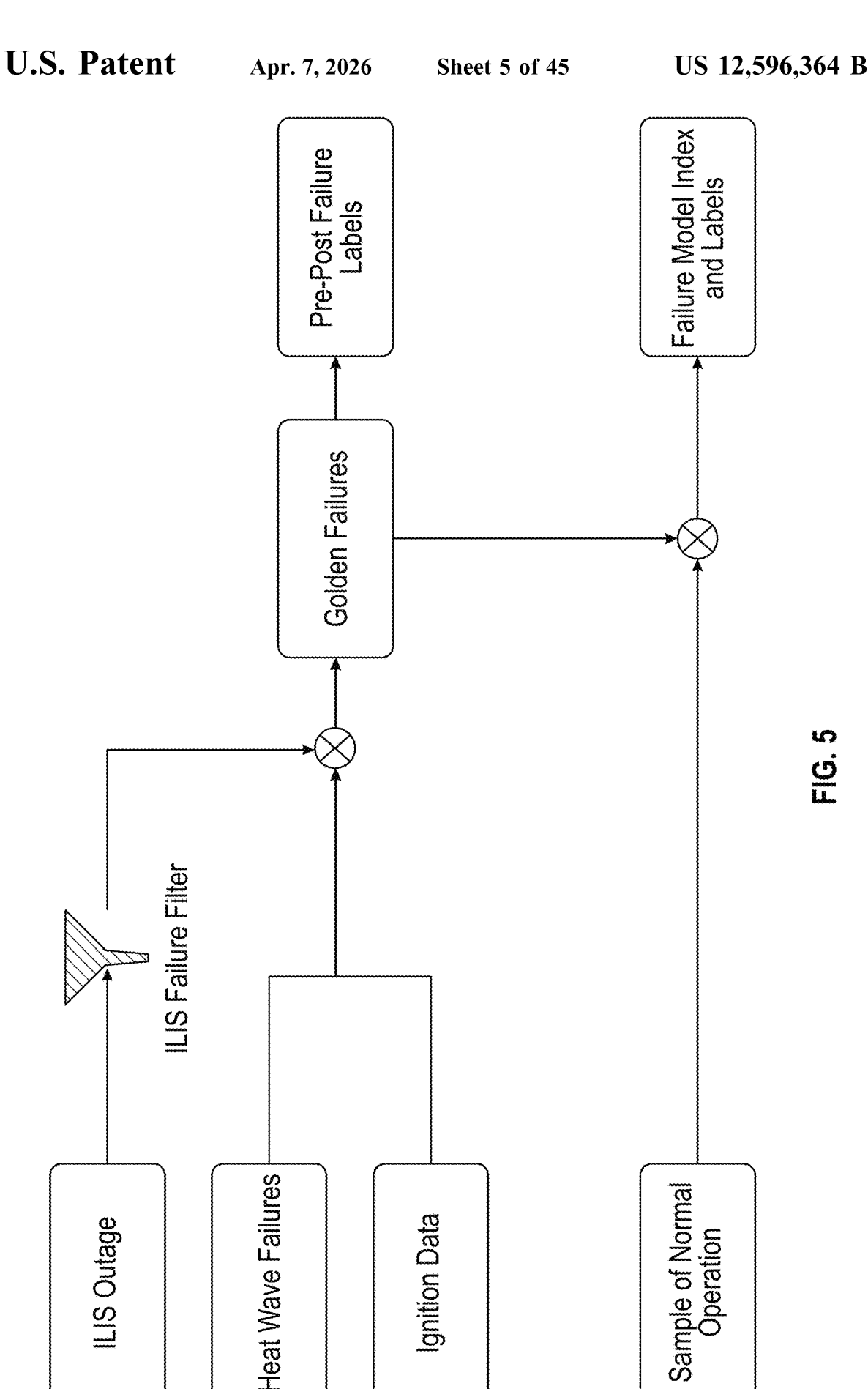
FIG. 5 shows a modeling process flow according to some embodiments.
Figure 6:
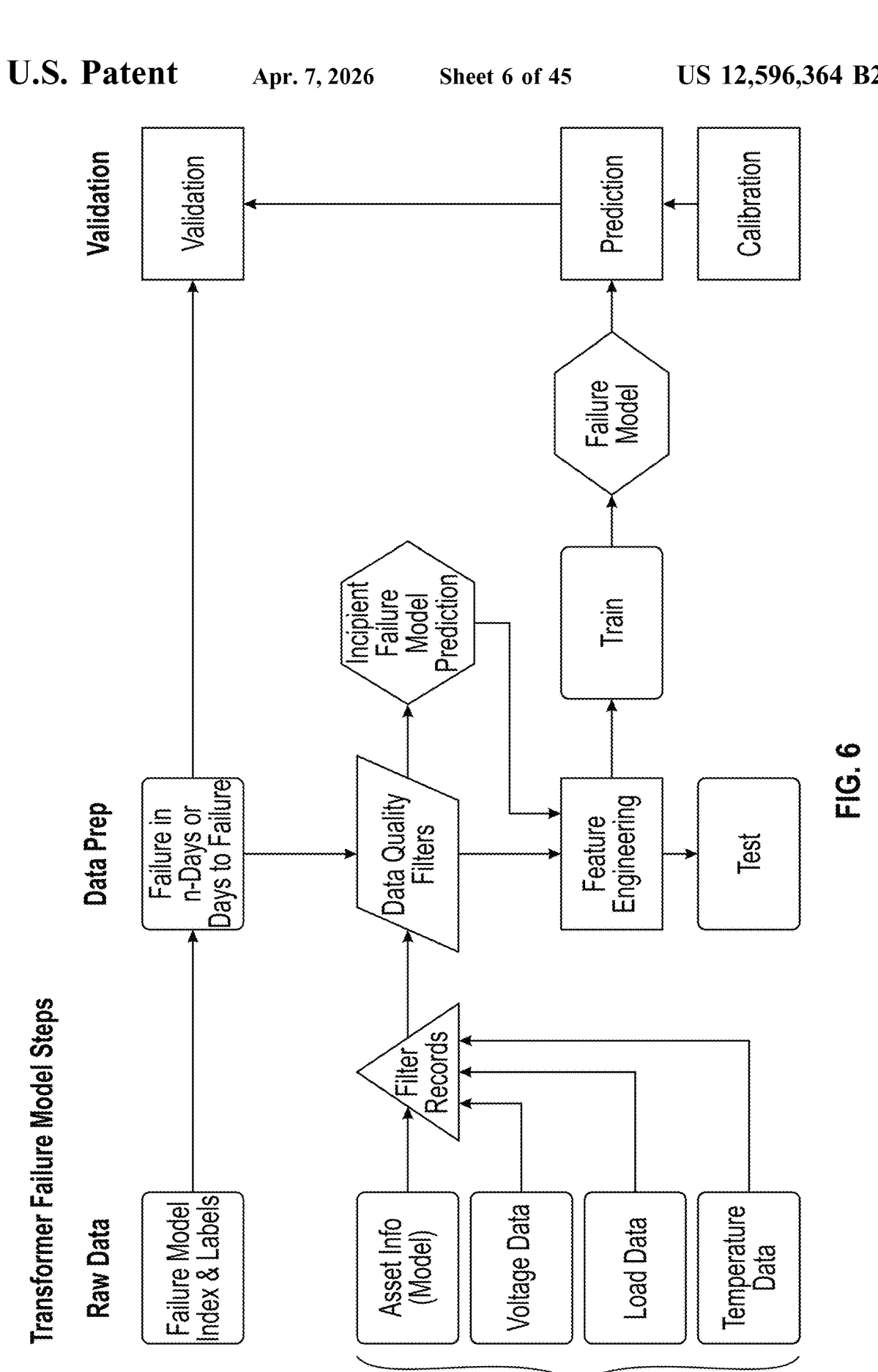
FIG. 6 illustrates a non-limiting example of transformer failure model steps according to some embodiments.

FIG. 5 shows a modeling process flow according to some embodiments. In some embodiments, failures input into the system include Integrated Logging and Information system (ILIS) outages, heat wave failures, and/or ignition failures, as non-limiting examples. In some embodiments, the ILIS is configured to model the actual electrical switching operations reported during a circuit restoration process. In some embodiments, the ILIS failure filter is configured to remove transformer anomalies that are related to intentional electrical distribution changes such as rerouting. In some embodiments, golden failure comprising distinct data failure indicators are stored and/or sent along with a sample of normal operating transformers for failure model indexing and labeling through a graphical user interface (GUI). In some embodiments, golden failure comprising distinct data failure indicators are sent to a pre-post failure module where a data failure indicators of pre-failure anomalies and/or post failure anomalies are labeled for AI training. In some embodiments, both the pre-post failure labels and the failure model index and labels are then used to train the AI model. FIG. 6 illustrates a non-limiting example of transformer failure model method steps according to some embodiments. FIG. 7 depicts a program for evaluating implementations of the system according to some embodiments.

FIGS. 7-28 illustrate a non-limiting system implementation overview including various system configurations and implemented steps according to some embodiments. In some embodiments, the system can be used in conjunction with the Electrical Program Investment Charge (EPIC) program to help achieve California's energy goals. FIG. 7 includes an overview of the California Epic program according to some embodiments. FIG. 8 shows an electrical distribution system suitable for implementation of the system according to some embodiments. FIG. 9 shows steps for system implementation and refinement by a utility according to some embodiments. FIG. 10 shows the system implemented as part of the Community Wildfire Safety Program (CWSP) according to some embodiments.

FIG. 11 illustrates the analogy of using aspects of the system as a "check engine light" according to some embodiments. FIG. 12 shows the system's data-drive asset strategy enablement according to some embodiments, which are discussed further with regard to FIG. 29. FIG. 13 illustrates a predictive maintenance strategy according to some embodiments. In some embodiments, the system is configured to generate survival probability charts based on historical failure. In some embodiments, the system is configured to generate failure reports and/or notification when an asset probability of survival falls below a pre-determined value (e.g., 50%).

FIG. 14 shows asset (component) analytics timeframes dependent on available data types according to some embodiments. In some embodiments, the system is configured to group assets (e.g., transformers) by term for analysis. In some embodiments, the system is configured to group monitoring of assets with long term life (e.g., 70%-99% expected useful life) for analysis based on historical data. In some embodiments, the system is configured to group monitoring of assets with medium term life (e.g., 30%-69% expected useful life) for analysis based on operational data. In some embodiments, the system is configured to group monitoring of assets with medium term life (e.g., 1%-29% expected useful life) for analysis based on AI data. FIG. 15 shows the phenomena of data resolution impact on observability of near real-time distribution system anomalies according to some embodiments. FIG. 16 shows the failure modes of data resolution impact on observability of near real-time distribution system anomalies according to some embodiments.

FIG. 17 shows the system's focus on electrical service transformers and not substation transformers according to some embodiments. In some embodiments, the system is configured to identify anomalies in service transformers, which include a transform that provides the transformation of the final voltage step in the AMI. Conventional practices do not include remote monitoring and/or analysis of service transformers according to some embodiments. In some embodiments, service transformers are only visually inspected every few years, or are allowed to run to failure due to no conventional monitoring techniques. FIG. 18 illustrates how the system targets failures manifesting in advanced metering infrastructure (AMI) voltage anomalies according to some embodiments. In some embodiments, the system is configured to predict asset failure types. In some embodiments, the system is configured to predict asset failure by identifying anomalies in AMI interval data. In some embodiments. In some embodiments, the system is configured to predict asset failure by identifying one or more of high and low voltage anomalies in AMI interval data.

FIG. 19 illustrates steps for implementing a supervised system machine learning process according to some embodiments. In some embodiments, an artificial intelligence model (AI); e.g., machine learning model) is trained with a training data set, where each data example is labeled as an example of an indication of a good or bad transformer (Tx). In some embodiments, the model training is then used by the model for prediction. In some embodiments, the system is configured to receive one or more remote monitoring parameters and output a transformer failure prediction based on the one or more remote monitoring parameters. In some embodiments, the system is configured to display the transformer failure prediction on a graphical user interface (GUI). In some embodiments, the system is configured to enable a user to change an output designation. In some embodiments, changing an output designation includes changing a "good" transformer output to a "bad" transformer output, and vice versa. In some embodiments, the term "good" as used herein means that a transformer is predicted to have between 50% to 99% of useful life remaining before failure. In some embodiments, the term "bad" as used herein means that a transformer is predicted to have between 1% and 49% of useful life remaining before failure. In some embodiments, "useful life" includes the average time and/or hours of use an asset is expected to provide before failure. In some embodiments, the system is configured to calculate useful life based on historical asset lifespan data. FIG. 21 shows system predictive analytics development and implementation process steps for transformers according to some embodiments.

FIG. 22 depicts a map of utility asset voltage distribution according to some embodiments. As evident by FIG. 22, manual inspection of all assets in an AMI would be too costly, and even if it were feasible, visual inspection would not yield the same type of data as provided by the system according to some embodiments. FIG. 23 shows how service transformer failure manifest in AMI voltage data according to some embodiments. In some embodiments, the system is configured to analyze voltage data to determine transform failure. In some embodiments, the AI model is configured to analyze and/or predict transformer health for one or more voltage signals as they are received by the system. In some embodiments, the system is configured to provide a summary data set to the AI model comprising a statistical representation of the one or more voltage signals that comprises fewer than all voltage signals in order to save computer resources.

FIG. 24 illustrates how transform failure logic implementation is a complex problem with many variables in some embodiments. In some embodiments, to overcome this challenge, the system is configured to compare each transformer signal to one or more upstream (toward the electrical supply) transformer signals and/or one or more downstream (away from the electrical supply) transformer signals. In some embodiments, one or more transformer signals include one or more signals from one or more transformer sensors. In some embodiments, one or more transfer sensors include voltage sensors, current sensors, power factor sensors, camera images, and the like, electrically or otherwise suitable coupled to a transformer. In some embodiments, one or more transformer signals include one or more signals from one or more (smart) meters located on a secondary conductor (see FIG. 32). In some embodiments, one or more downstream transformer signals comprise a signal from a nearest downstream transformer. FIG. 25 shows a model and use case development according to some embodiments. FIG. 26 shows how the system provides the benefit of reducing wildfire risk, unplanned outage cost, and customer claims according to some embodiments.

FIG. 27 depicts system data quality challenges and mitigations according to some embodiments. In some embodiments, the system includes a system asset data foundation (central repository) configured to store all inspection data, which includes transformer signals. In some embodiments, the system is configured to provide training to inspectors to insure consistent inspection results. FIG. 28 shows a system asset data foundation concept according to some embodiments. In some embodiments, the asset data foundation includes one or more of spatial and/or as-built data; asset failure data; asset condition data; work management and/or grid planning; asset operational data; and external environment data.

FIGS. 29-31 depict data analytics executed by the system for predictive maintenance according to some embodiments. FIG. 29 shows one or more components of the system's data analytics platform according to some embodiments. In some embodiments, the system is configured to input data from one or more data sources into the AI model. In some embodiments, one or more data sources include one or more of data (e.g., transformer signals) from the AMI assets, data received by a supervisory and data acquisition system (SCADA), gas insulated substation (GIS) data, senior authorized person (SAP) data, historical asset failures, and outage data, as non-limiting examples. FIG. 30 illustrates the system's ability to predict a wide timeframe of incipient failures according to some embodiments. In some embodiments, the system is configured to generate one or more actions based on a predicted failure. In some embodiments, the one or more actions include scheduling maintenance, rerouting electricity, ordering of replacement parts and/or assets, generating reports and/or initiating replacement of assets predicted to fail within a specified timeframe. FIG. 31 list various benefits provided by the system's predictive maintenance implementation according to some embodiments.

FIG. 32 shows a diagram of some assets (components) and terms used in the system according to some embodiments. In some embodiments, each service point meter (sp) represents an electrical meter which may be a smart meter configured to transmit electrical data. In some embodiments, electrical data includes one or more voltage, current, phase, power factor, and/or any conventional meter reading. FIG. 32 illustrates the concept of using multiple meters to determine a transformer's operational status according to some embodiments. In some embodiments, the system is configured to analyze the data from the one or more smart meters, where each of the one or more smart meters represent a transformer signal. In some embodiments, the system is configured to output a transformer data that includes the analysis.

FIG. 33 shows system objectives for initial implementations by a utility according to some embodiments. In some embodiments, the system is configured to be initially trained with historical source data. In some embodiments, the system is configured to compare operational data during an initial monitoring period (prediction horizon). In some embodiments, when the asset data trend statistically matches the model (true), the system is configured to begin generating period notifications. In some embodiments, the periodic notifications include a useful life estimate. In some embodiments, the periodic notifications include one or more charts, graphs, and/or statistical analysis comprising data from one or more sensors mentioned herein.

FIG. 34 illustrates how a model is developed and benchmarked with voltage anomaly features according to some embodiments. Referring back to FIG. 32, in some embodiments each sp may comprise one or more phases. In some embodiments, as discussed herein, aggregation of sp data is used to derive a statistical representative transformer signal for a given transformer. In some embodiments, the system is configured to use transformer signals from upstream transformers (bellwether meters) and/or downstream transformers (bellwether meters) as bellwether signals for a particular transformer. In some embodiments, the system is configured to execute a computer implement step of obtaining one or more bellwether signals and/or sending the bellwether signals to the AI model for analysis.

FIG. 35 shows different system phase implementations according to some embodiments. In some embodiments, the system is configured to enable a user to label a failure as one or more of a heatwave failure, an outage related failure, and an ignition failure. In some embodiments, the AI model is configured to indicate if a failure is likely (above a predetermined threshold value; statistically) to result in an outage and/or ignition (fire). In some embodiments, the system is configured to suggest new power routing around assets that require maintenance and/or have a high probability of failure, including those that would cause outage and/or ignition.

FIG. 36 illustrates the various steps for building an AI model to implement one or more aspects of the system according to some embodiments.

FIG. 37 shows system identification of a potential windings failure after a lightning event according to some embodiments.

FIG. 38 shows a system identification of a potential non-technical loss that may lead to transformer overloading due to un-metered energy use according to some embodiments.

FIG. 39 shows steps for system implementation and refinement by a utility according to some embodiments. FIG. 40 shows various subsystems that the system uses to collect data inputs according to some embodiments. FIG. 41 shows a flowchart for implementing corrective action for various types of identified anomalies according to some embodiments. FIG. 42 shows a flowchart for creating transformer incipient failure day labels. FIG. 43 shows inputting transformer incipient failure day labels for prediction and validation. FIG. 44 shows filtering and compiling to generate prepared features according to some embodiments.

FIG. 45 illustrates a computer system 1010 enabling or comprising the systems and methods in accordance with some embodiments of the system. In some embodiments, the computer system 1010 can operate and/or process computer-executable code of one or more software modules of the aforementioned system and method. Further, in some embodiments, the computer system 1010 can operate and/or display information within one or more graphical user interfaces (e.g., HMIs) integrated with or coupled to the system.

In some embodiments, the computer system 1010 can comprise at least one processor 1032. In some embodiments, the at least one processor 1032 can reside in, or coupled to, one or more conventional server platforms (not shown). In some embodiments, the computer system 1010 can include a network interface 1035*a* and an application interface 1035*b* coupled to the least one processor 1032 capable of processing at least one operating system 1034. Further, in some embodiments, the interfaces 1035*a*, 1035*b* coupled to at least one processor 1032 can be configured to process one or more of the software modules (e.g., such as enterprise applications 1038). In some embodiments, the software application modules 1038 can include server-based software and can operate to host at least one user account and/or at least one client account, and operate to transfer data between one or more of these accounts using the at least one processor 1032.

With the above embodiments in mind, it is understood that the system can employ various computer-implemented operations involving data stored in computer systems. Moreover, the above-described databases and models described throughout this disclosure can store analytical models and other data on computer-readable storage media within the computer system 1010 and on computer-readable storage media coupled to the computer system 1010 according to various embodiments. In addition, in some embodiments, the above-described applications of the system can be stored on computer-readable storage media within the computer system 1010 and on computer-readable storage media coupled to the computer system 1010. In some embodiments, these operations are those requiring physical manipulation of physical quantities. Usually, though not necessarily, in some embodiments these quantities take the form of one or more of electrical, electromagnetic, magnetic, optical, or magneto-optical signals capable of being stored, transferred, combined, compared and otherwise manipulated. In some embodiments, the computer system 1010 can comprise at least one computer readable medium 1036 coupled to at least one of at least one data source 1037*a*, at least one data storage 1037*b*, and/or at least one input/output 1037*c*. In some embodiments, the computer system 1010 can be embodied as computer readable code on a computer readable medium 1036. In some embodiments, the computer readable medium 1036 can be any data storage that can store data, which can thereafter be read by a computer (such as computer 1040). In some embodiments, the computer readable medium 1036 can be any physical or material medium that can be used to tangibly store the desired information or data or instructions and which can be accessed by a computer 1040 or processor 1032. In some embodiments, the computer readable medium 1036 can include hard drives, network attached storage (NAS), read-only memory, random-access memory, FLASH based memory, CD-ROMs, CD-Rs, CD-RWs, DVDs, magnetic tapes, other optical and non-optical data storage. In some embodiments, various other forms of computer-readable media 1036 can transmit or carry instructions to a remote computer 1040 and/or at least one user 1031, including a router, private or public network, or other transmission or channel, both wired and wireless. In some embodiments, the software application modules 1038 can be configured to send and receive data from a database (e.g., from a computer readable medium 1036 including data sources 1037*a* and data storage 1037*b* that can comprise a database), and data can be received by the software application modules 1038 from at least one other source. In some embodiments, at least one of the software application modules 1038 can be configured within the computer system 1010 to output data to at least one user 1031 via at least one graphical user interface rendered on at least one digital display.

In some embodiments, the computer readable medium 1036 can be distributed over a conventional computer network via the network interface 1035*a* where the system embodied by the computer readable code can be stored and executed in a distributed fashion. For example, in some embodiments, one or more components of the computer system 1010 can be coupled to send and/or receive data through a local area network ("LAN") 1039*a* and/or an internet coupled network 1039*b* (e.g., such as a wireless internet). In some embodiments, the networks 1039*a*, 1039*b* can include wide area networks ("WAN"), direct connections (e.g., through a universal serial bus port), or other forms of computer-readable media 1036, or any combination thereof.

In some embodiments, components of the networks 1039*a*, 1039*b* can include any number of personal computers 1040 which include for example desktop computers, and/or laptop computers, or any fixed, generally non-mobile internet appliances coupled through the LAN 1039*a*. For example, some embodiments include one or more of personal computers 1040, databases 1041, and/or servers 1042 coupled through the LAN 1039*a* that can be configured for any type of user including an administrator. Some embodiments can include one or more personal computers 1040 coupled through network 1039*b*. In some embodiments, one or more components of the computer system 1010 can be coupled to send or receive data through an internet network (e.g., such as network 1039*b*). For example, some embodiments include at least one user 1031*a*, 1031*b*, is coupled wirelessly and accessing one or more software modules of the system including at least one enterprise application 1038 via an input and output ("I/O") 1037*c*. In some embodiments, the computer system 1010 can enable at least one user 1031*a*, 1031*b*, to be coupled to access enterprise applications 1038 via an I/O 1037*c* through LAN 1039*a*. In some embodiments, the user 1031 can comprise a user 1031*a* coupled to the computer system 1010 using a desktop computer, and/or laptop computers, or any fixed, generally non-mobile internet appliances coupled through the internet 1039*b*. In some embodiments, the user can comprise a mobile user 1031*b* coupled to the computer system 1010. In some embodiments, the user 1031*b* can connect using any mobile computing 1031*c* to wireless coupled to the computer system 1010, including, but not limited to, one or more personal digital assistants, at least one cellular phone, at least one mobile phone, at least one smart phone, at least one pager, at least one digital tablets, and/or at least one fixed or mobile internet appliances.

The subject matter described herein are directed to technological improvements to the field of predictive maintenance by using artificial intelligence including data collection and machine learning to identify anomalies indicative of failure in components that are part of a utility grid. The disclosure describes the specifics of how a machine including one or more computers comprising one or more processors and one or more non-transitory computer readable media implement the system and its improvements over the prior art. The instructions executed by the machine cannot be performed in the human mind or derived by a human using a pen and paper but require the machine to convert process input data to useful output data. Moreover, the claims presented herein do not attempt to tie-up a judicial exception with known conventional steps implemented by a general-purpose computer; nor do they attempt to tie-up a judicial exception by simply linking it to a technological field. Indeed, the systems and methods described herein were unknown and/or not present in the public domain at the time of filing, and they provide technologic improvements advantages not known in the prior art. Furthermore, the system includes unconventional steps that confine the claim to a useful application.

It is understood that the system is not limited in its application to the details of construction and the arrangement of components set forth in the previous description or illustrated in the drawings. The system and methods disclosed herein fall within the scope of numerous embodiments. The previous discussion is presented to enable a person skilled in the art to make and use embodiments of the system. Any portion of the structures and/or principles included in some embodiments can be applied to any and/or all embodiments: it is understood that features from some embodiments presented herein are combinable with other features according to some other embodiments. Thus, some embodiments of the system are not intended to be limited to what is illustrated but are to be accorded the widest scope consistent with all principles and features disclosed herein.

Some embodiments of the system are presented with specific values and/or setpoints. These values and setpoints are not intended to be limiting and are merely examples of a higher configuration versus a lower configuration and are intended as an aid for those of ordinary skill to make and use the system.

Any text in the drawings is part of the system's disclosure and is understood to be readily incorporable into any description of the metes and bounds of the system. Any functional language in the drawings is a reference to the system being configured to perform the recited function, and structures shown or described in the drawings are to be considered as the system comprising the structures recited therein. It is understood that defining the metes and bounds of the system using a description of images in the drawing does not need a corresponding text description in the written specification to fall with the scope of the disclosure.

Furthermore, acting as Applicant's own lexicographer, Applicant imparts the explicit meaning and/or disavow of claim scope to the following terms:

Applicant defines any use of "and/or" such as, for example, "A and/or B," or "at least one of A and/or B" to mean element A alone, element B alone, or elements A and B together. In addition, a recitation of "at least one of A, B, and C," a recitation of "at least one of A, B, or C," or a recitation of "at least one of A, B, or C or any combination thereof" are each defined to mean element A alone, element B alone, element C alone, or any combination of elements A, B and C, such as AB, AC, BC, or ABC, for example.

"Substantially" and "approximately" when used in conjunction with a value encompass a difference of 5% or less of the same unit and/or scale of that being measured.

"Simultaneously" as used herein includes lag and/or latency times associated with a conventional and/or proprietary computer, such as processors and/or networks described herein attempting to process multiple types of data at the same time. "Simultaneously" also includes the time it takes for digital signals to transfer from one physical location to another, be it over a wireless and/or wired network, and/or within processor circuitry.

As used herein, "can" or "may" or derivations there of (e.g., the system display can show X) are used for descriptive purposes only and is understood to be synonymous and/or interchangeable with "configured to" (e.g., the computer is configured to execute instructions X) when defining the metes and bounds of the system. The phrase "configured to" also denotes the step of configuring a structure or computer to execute a function in some embodiments.

In addition, the term "configured to" means that the limitations recited in the specification and/or the claims must be arranged in such a way to perform the recited function: "configured to" excludes structures in the art that are "capable of" being modified to perform the recited function but the disclosures associated with the art have no explicit teachings to do so. For example, a recitation of a "container configured to receive a fluid from structure X at an upper portion and deliver fluid from a lower portion to structure Y" is limited to systems where structure X, structure Y, and the container are all disclosed as arranged to perform the recited function. The recitation "configured to" excludes elements that may be "capable of" performing the recited function simply by virtue of their construction but associated disclosures (or lack thereof) provide no teachings to make such a modification to meet the functional limitations between all structures recited. Another example is "a computer system configured to or programmed to execute a series of instructions X, Y, and Z." In this example, the instructions must be present on a non-transitory computer readable medium such that the computer system is "configured to" and/or "programmed to" execute the recited instructions: "configure to" and/or "programmed to" excludes art teaching computer systems with non-transitory computer readable media merely "capable of" having the recited instructions stored thereon but have no teachings of the instructions X, Y, and Z programmed and stored thereon. The recitation "configured to" can also be interpreted as synonymous with operatively connected when used in conjunction with physical structures.

It is understood that the phraseology and terminology used herein is for description and should not be regarded as limiting. The use of "including," "comprising," or "having"

and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The previous detailed description is to be read with reference to the figures, in which like elements in different figures have like reference numerals. The figures, which are not necessarily to scale, depict some embodiments and are not intended to limit the scope of embodiments of the system.

Any of the operations described herein that form part of the invention are useful machine operations. The invention also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general-purpose computer selectively activated or configured by one or more computer programs stored in the computer memory, cache, or obtained over a network. When data is obtained over a network the data can be processed by other computers on the network, e.g., a cloud of computing resources.

The embodiments of the invention can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, some embodiments include methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable, and non-removable storage media implemented in any method or technology for the tangible storage of information such as computer-readable instructions, data structures, program modules or other data.

As used herein, reference to method steps is also a reference to computer implemented steps according to some embodiments. Although method operations are presented in a specific order according to some embodiments, the execution of those steps do not necessarily occur in the order listed unless explicitly specified. Also, other housekeeping operations can be performed in between operations, operations can be adjusted so that they occur at slightly different times, and/or operations can be distributed in a system which allows the occurrence of the processing operations at various intervals associated with the processing, as long as the processing of the overlay operations are performed in the desired way and result in the desired system output.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

We claim:

1. A system for predicting asset failure in an electrical distribution system comprising:
   a first asset,
   a first electrical meter,
   a second asset,
   a second electrical meter,
   an artificial intelligence (AI) model, and
   one or more computers comprising one or more processors and one or more non-transitory computer readable media, the one or more non-transitory computer readable media including program instructions stored thereon that when executed cause the one or more computers to:
   receive, by the one or more processors, first meter data from the first electrical meter;
   associate, by the one or more processors, the first meter data with the first asset to create first asset data;
   receive, by the one or more processors, second meter data from the second electrical meter;
   associate, by the one or more processors, the second meter data with the second asset to create second asset data;
   send, by the one or more processors, the first asset data and the second asset data to the AI model; and
   generate, by the one or more processors, a graphical user interface (GUI) comprising an input configured to enable a user to designate the first asset data as a match or a non-match for a condition.

2. The system of claim 1, wherein the one or more non-transitory computer readable media include program instructions stored thereon that when executed further cause the one or more computers to:
   receive, by the one or more processors, a first asset designation comprising a designation by the user of the first asset as a first match or a first non-match for the condition;
   wherein sending the first asset data and the second asset data to the AI model includes sending the first asset designation; and
   wherein the first asset data and the second asset data are used to train the AI model.

3. The system of claim 1, further comprising:
   a data analytics platform;
   wherein the one or more non-transitory computer readable media include program instructions stored thereon that when executed further cause the one or more computers to:
   determine, by the data analytics platform, a life expectancy of the first asset based on the first asset data.

4. A system for predicting asset failure in an electrical distribution system comprising:

a first asset, a first electrical meter, a second asset, a second electrical meter, an artificial intelligence (AI) model, and one or more computers comprising one or more processors and one or more non-transitory computer readable media, the one or more non-transitory computer readable media including program instructions stored thereon that when executed cause the one or more computers to:

receive, by the one or more processors, first meter data from the first electrical meter;

associate, by the one or more processors, the first meter data with the first asset to create first asset data;

receive, by the one or more processors, second meter data from the second electrical meter;

associate, by the one or more processors, the second meter data with the second asset to create second asset data;

send, by the one or more processors, the first asset data and the second asset data to the AI model;

output, by the AI model, a first asset designation comprising a first designation of the first asset as a first match or a first non-match for a condition; and output, by the AI model, a second asset designation comprising a second designation of the second asset as a second match or a second non-match for the condition.

5. The system of claim 4, wherein the one or more non-transitory computer readable media include program instructions stored thereon that when executed further cause the one or more computers to:

generate, by the one or more processors, a graphical user interface comprising at least one of the first asset designation and the second asset designation;

generate, by the one or more processors, an input for changing at least one of the first asset designation and the second asset designation;

receive, by the one or more processors, a changed designation comprising a change of at least one of the first asset designation and the second asset designation; and send, by the one or more processors, the changed designation to the AI model to improve a decision analysis of the AI model.

6. A method for creating an artificial intelligence model to predict asset failure in an electrical distribution system comprising the steps of:

receiving first meter data from a first electrical meter;

associating the first meter data with a first asset to create first asset data;

receiving second meter data from a second electrical meter;

associating the second meter data with a second asset to create second asset data;

designating the first asset data as a first match or a first non-match for a condition; and sending the first asset data and the second asset data to an artificial intelligence (AI) model as a training set;

outputting a result of a decision analysis by the AI model, the results comprising a match designation or a non-match designation for the condition for the second asset;

generating a graphical user interface comprising the result;

generating an input for changing the result to create a changed result; and sending the changed result to the AI model to improve the decision analysis.

7. The method of claim 6, further comprising the steps of:

creating a plurality of asset data by associating meter data from one or more meters to each of a plurality of assets; and sending the plurality of asset data to the AI model for a decision analysis.

8. The method of claim 7, further comprising the step of:

outputting results of the decision analysis, the results comprising a match designation or a non-match designation for the condition for each of the plurality of assets.

9. The method of claim 8, further comprising the steps of:

generating a graphical user interface comprising at least one of the results;

generating an input for changing at least one of the results to create a changed result; and sending the changed result to the AI model to improve the decision analysis.

10. The method of claim 9, wherein the decision analysis includes a transformer failure prediction.

11. The method of claim 9, wherein the plurality of assets includes at least one transformer.

12. The method of claim 6, wherein the first asset and/or second asset comprises a transformer.

* * * * *